United States Patent
Cobb et al.

(10) Patent No.: US 11,077,559 B2
(45) Date of Patent: Aug. 3, 2021

(54) SUPPORT ROBOT AND METHODS OF USE THEREOF

(71) Applicant: HONDA MOTOR CO., LTD., Tokyo (JP)

(72) Inventors: Derrick Ian Cobb, Delaware, OH (US); Eric C. Baker, Saint Marys, OH (US); Richard Wolfgang Geary, Hilliard, OH (US); David Bryan Betz, West Jefferson, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 16/210,689

(22) Filed: Dec. 5, 2018

(65) Prior Publication Data
US 2020/0180159 A1 Jun. 11, 2020

(51) Int. Cl.
*B25J 5/00* (2006.01)
*B25J 11/00* (2006.01)
(Continued)

(52) U.S. Cl.
CPC .............. *B25J 11/008* (2013.01); *B25J 5/007* (2013.01); *B25J 9/1674* (2013.01); *B25J 19/023* (2013.01);
(Continued)

(58) Field of Classification Search
CPC .................... B25J 11/008; B25J 5/007; G05B 2219/40202; G05B 19/41865;
(Continued)

(56) References Cited

U.S. PATENT DOCUMENTS

| 7,228,203 B2 | 6/2007 | Koselka et al. |
| 8,682,482 B2 | 3/2014 | Kosuge et al. |

(Continued)

OTHER PUBLICATIONS https://www.audi-mediacenter.com/en/photos/album/techday-smart-factory-721, as accessed on Dec. 5, 2018.
(Continued)

*Primary Examiner* — Dale Moyer
(74) *Attorney, Agent, or Firm* — Arent Fox LLP

(57) ABSTRACT

A support robot and control system for timely and efficiently providing at least one of a tool, a part, a component, an electrical supply, and an air supply within an assembly line operation. The support robot and system may include a detection unit for detecting user and a motion planning unit for controlling the motion of the robot based on data received from the detection unit. The support robot may further include an input unit for receiving input from a user. The system may estimate work progress of a user via a work progress estimation unit. The work progress estimation unit may determine work production based on at least an output from the detection unit and information obtained from a work progress database. The system may further include a robot location adjustment unit. The robot location adjustment unit may adjust the location of the robot based on information received from the motion planning unit. Further, the support robot may include a moveable tray, wherein the movable tray is adjusted based on instructions received from the work progress estimation unit.

18 Claims, 14 Drawing Sheets

(51) Int. Cl.
*B25J 9/16* (2006.01)
*G05B 19/418* (2006.01)
*B25J 19/02* (2006.01)
*B65G 1/04* (2006.01)
*G05D 1/12* (2006.01)
*G05D 1/02* (2020.01)

(52) U.S. Cl.
CPC ........ *B65G 1/0492* (2013.01); *G05B 19/4183* (2013.01); *G05B 2219/31289* (2013.01); *G05B 2219/40202* (2013.01); *G05D 1/0255* (2013.01); *G05D 1/0276* (2013.01); *G05D 1/12* (2013.01)

(58) Field of Classification Search
CPC ........... G05B 2219/31455; G05B 2219/50391; G05B 19/41805
See application file for complete search history.

(56) References Cited

U.S. PATENT DOCUMENTS

| | | | |
|---|---|---|---|
| 9,395,723 | B2 | 7/2016 | Pari et al. |
| 9,643,779 | B2 | 5/2017 | Yamada |
| 2009/0210090 | A1* | 8/2009 | Takemitsu ............ B25J 9/1661 700/245 |
| 2011/0184555 | A1* | 7/2011 | Kosuge ................... B25J 11/00 700/245 |
| 2015/0352719 | A1 | 12/2015 | Nakazato et al. |
| 2018/0126558 | A1* | 5/2018 | Ooba ................. G06K 9/00382 |
| 2018/0326584 | A1* | 11/2018 | Wang ..................... B25J 9/1669 |
| 2019/0064838 | A1* | 2/2019 | Kuno ..................... G05D 1/0246 |
| 2019/0105779 | A1* | 4/2019 | Einav .................... B25J 9/1697 |

OTHER PUBLICATIONS https://www.youtube.com/watch?v=sqCbYd808MU, as accessed on Dec. 5, 2018.

* cited by examiner

SUPPORT ROBOT AND METHODS OF USE THEREOF

FIELD OF THE INVENTION

Aspects of the present disclosure relate to a support robot capable of providing assistance to a technician. More specifically, a support robot that is capable of determining work progress and providing necessary parts and/or tools to a technician.

BACKGROUND

Modern assembly lines and/or automobile assembly or repair processes still rely on tasks performed by technicians. Automation has significantly reduced the number of tasks performed by technicians, however, a number of tasks cannot be effectively or efficiently performed by automated systems due in part to an automated system's lack of ability to respond flexibly to changes in the assembly process and/or perform certain complex tasks. Thus, the need for technicians in an assembly and/or repair environment still exists. However, the need remains to improve efficiency of certain tasks to be completed in the manufacturing environment without reliance on full automation. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, disclosed is a support robot for providing to a user at least one selected from a group consisting of a tool, a part, a component, an electrical supply, a welding gas supply, and an air supply. The robot may include a detection unit for detecting a user motion or other signal and a motion planning unit for controlling the motion of the robot based on an output from the detection unit. The robot may further include at least one input unit for receiving an input from a user and a work progress estimation unit for estimating a work progress of a user based on an output from the detection unit and a work progress database. The motion planning unit may adjust a location of the robot via a location adjustment unit. A position of a movable tray on the support robot may be adjusted or updated based on the output of the work progress estimation unit.

In accordance with one aspect of the disclosure, the support robot may further include a moveable tray. The moveable tray may be adjusted based on an output from the work progress estimation unit. The support robot may further include an upper level planning unit for updating at least one of a work process and progress database and a worker profile and trend database based on at least one of an input from the input unit and an input from the detection unit.

In accordance with one aspect of the disclosure, the robot may include a detection unit for detecting a user motion or other signal and a base portion operatively connected to a plurality of motors, wherein each of the plurality of motors is connected to at least one wheel. The support robot may further include a robot motion planning unit and a robot location adjustment unit in operative communication with and controlling the plurality motors based on at least an output from the detection unit. The support robot may further include at least one rotatable tray connected to the base portion and rotatable about a first axis. Further, the support robot may include at least one tray position adjustment unit, wherein the tray position adjustment unit controls the rotation of the tray about the first axis.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
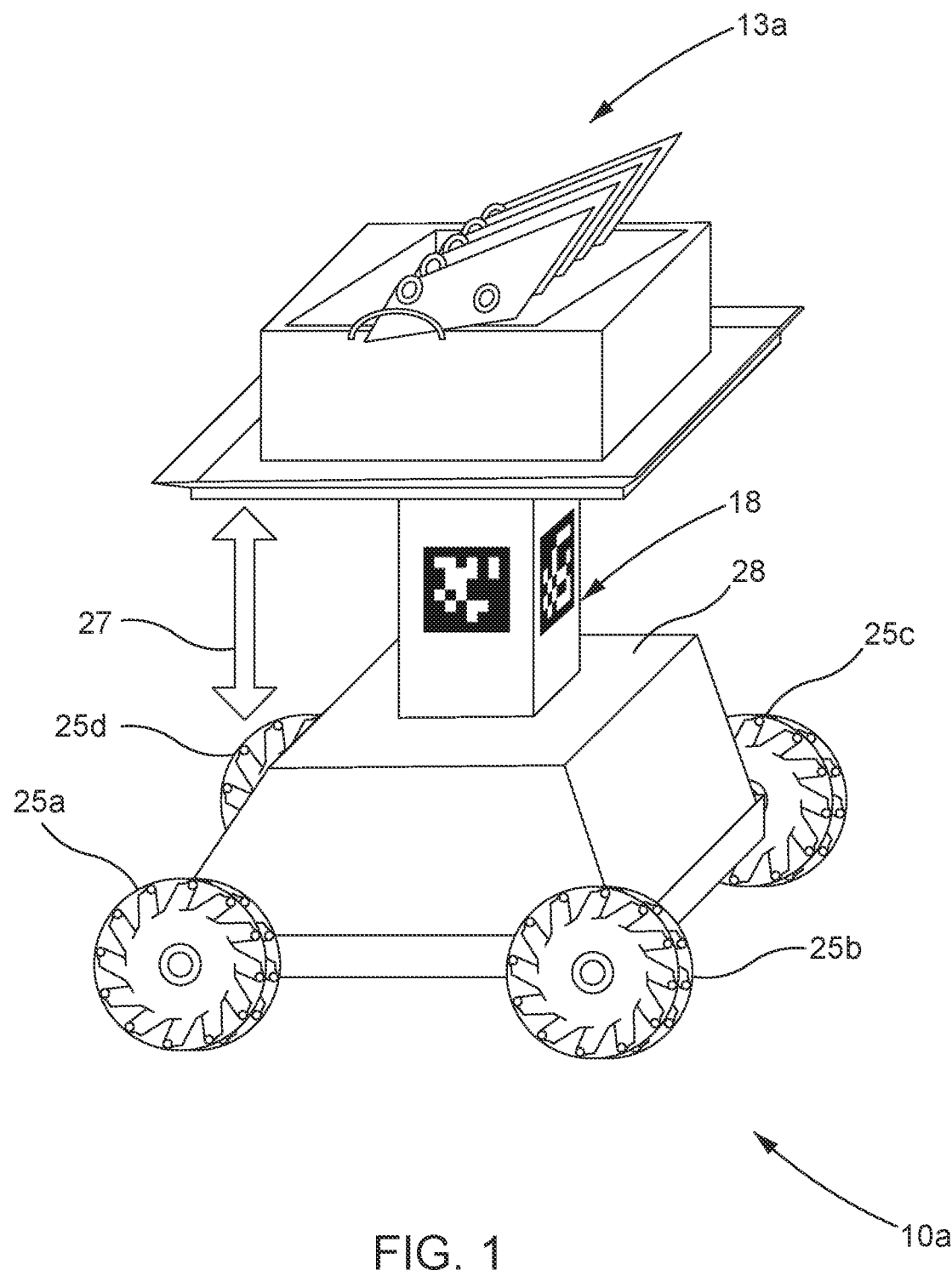
FIG. 1 is a perspective view of a support robot system in accordance with an aspect of the disclosure.

The disclosure relates to a support robot apparatus and system. The working support robot system 10 shown in FIGS. 1 and 2a may include similar components, however, various differences may be noted throughout the disclosure. The figures and corresponding description are intended to show various examples that may be used separately or in combination. A support robot system 10a or 10b may be equipped with one or more wheels 25a-d operatively mounted to a base portion 28. It is noted that throughout the specification, while examples of a support robot system using four wheels is depicted, any similar suitable system may be used. For example, the support robot may include two tracks or conveyors 60 (FIG. 7) operatively mounted to either side of the base portion 28. Further, the support robot 10 may have less than four wheels or more than four wheels. One example may utilize a drive mechanism having three wheels, wherein each wheel may be located 120 degrees relative to the other wheels.

Figure 2A:
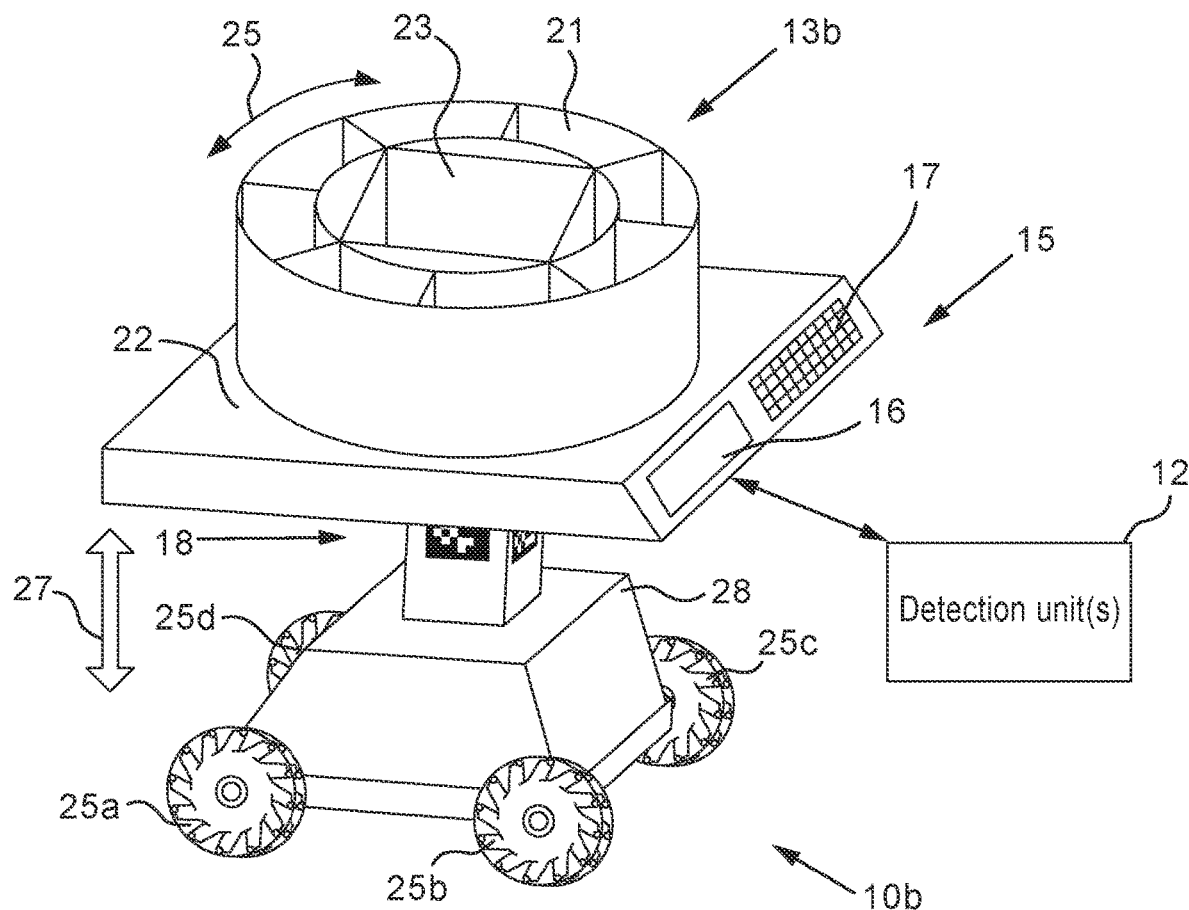
FIG. 2a is a perspective view of a support robot system in accordance with an aspect of the disclosure.

In the example shown in FIGS. 1 and 2a, four wheels 25a-d are shown. Each of the wheels 25a-d may be operatively connected to a motor (not shown in FIGS. 1 and 2a). The motor may be any known type of motor. In one example, each motor may be a stepper motor or brushless electric motor to allow fine control of each motor.

In the aforementioned examples, a pulse received by each motor may move a motor shaft through a fixed angle to operatively control each of wheels 25a-d individually. At least one of wheels 25a-d may be an omni-directional wheel, also interchangeably referred to herein as an omni-wheel. An omni-wheel is a wheel that can turn around two perpendicular axes contemporaneously. In an omni-wheel, spinning mini-wheels may be arranged around the perimeter of the main angle of motion. These side spinning wheels enable the main wheel to spin in a direction other than the direction of motion. Using proper control algorithms to control a motor in operative communication with each wheel, the wheels may be used to make the vehicle go in virtually any direction, including directly sideways, relative to the robot's normal forward direction. Examples of omni-wheels are disclosed in U.S. Pat. No. 7,980,335 to Potter, and U.S. Pat. No. 7,621,355 to Chu et al., the entirety of each of which is incorporated by reference herein.

Further, at least one of or any number of wheels 25a-d may be a mecanum wheel. A mecanum wheel may be similar to an omni-wheel and may consist of a number of rollers around the circumference of a larger wheel and hub. The rollers may be oriented at some angle in relation to the axis of rotation of the larger wheel about the hub. With such a configuration each of the rollers, in turn, may be able to rotate about their own axis. Using motor control, the mecanum wheel may have the ability to move instantaneously in any direction from any configuration. One example of a mecanum wheel is disclosed in U.S. Pat. No. 3,876,255 to Erland, the entirety of which is incorporated by reference herein. In the example using an omni-wheel or mecanum wheel, each of wheels 25a-d may be individually rotationally controlled to allow for a wide range of motion of the support robot 10, for example. One example of the disclosure may use omni-wheels and/or mecanum wheels in a drive mechanism having a three wheel drive system. In the example using three wheels, each wheel may be located at 120 degrees relative to the other wheels, for example. Using motor control, the omni-wheel and/or mecanum wheels may allow the three wheel drive system move the support robot 10 in any direction from any configuration.

Figure 2B:
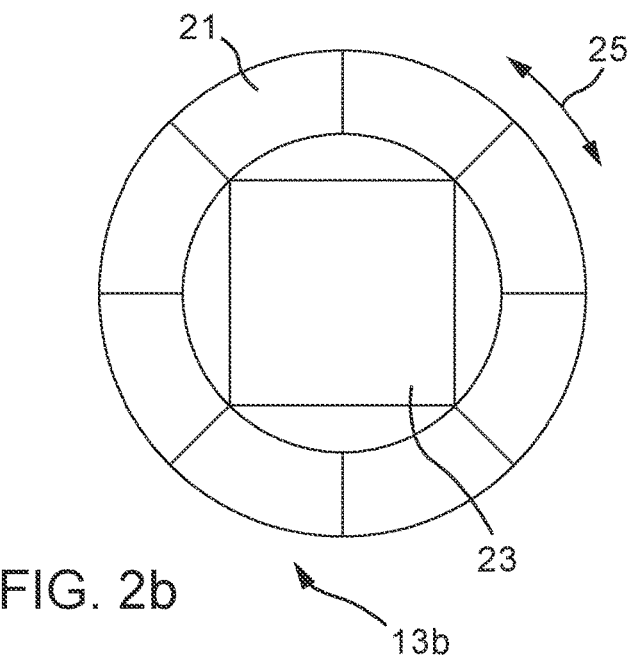
FIG. 2b is a top view of a support robot tray in accordance with an aspect of the disclosure.

As shown in FIGS. 1-2a, the support robot 10 may further include a tool and/or part holder 13a and/or 13b. Throughout the specification, the tool and/or part holder 13a and/or 13b may also be interchangeably referred to as a tray or movable tray. As shown in FIG. 1, the tool holder 13a may include a single compartment or plurality of dividers, for example. In one example, the tool and/or part holder 13b may be cylindrical and include a plurality of compartments. Some examples of such compartments are shown by reference numbers 21 and 23 in FIGS. 2a and 2b. Further, the tool and/or part holder may be rotatable in relation to the base portion 28 of the support robot 10, such as in a single or multiple rotational directions 25. The tool and/or part holder 13 may further be removable and exchangeable for another tool and/or part holder either having the same or a different configuration from the replaced tool and/or part holder 13. In one example, a first tray 13 may be installed onto a support robot 10, and the first tray 13 may be configured to store a first type of tool(s) and/or part(s). The first tray 13 may be exchanged for a second tray (not shown). The second tray may be configured to store a second type of tool(s) and/or part(s). Accordingly, the support robot 10 may be adaptable to support the completion of a number of different tasks by a technician and/or user by exchanging trays so as to match each task.

The support robot may further include an input unit 15. The input unit may include any known method and apparatus enabling a user to receive and/or input information. For example, the input unit 15 may receive commands input from the user via a keyboard and/or key pad 17. Further, the input unit 15 may include a verbal command unit. The verbal command unit may include, for example, a microphone or other sound gathering device and a verbal recognition function configured to recognize and translate for use (e.g., in data gathering or operational inputs) received commands from a user. In one aspect, the user may select and input a specific user profile via the input unit 15. The input unit 15 may also include a screen or display 16 for displaying a graphical user interface (GUI) and information contained therein. For example, the GUI may be configured to display information related to the function of the support robot, which may be monitored, for example, by the user. In one example, the GUI may display work progress to a user. In another example, a user override and/or update the estimated work progress via the input unit.

The support robot 10 may further include a height adjustment mechanism that may be capable of adjusting the height of the tray 13a and/or 13b in relation to the base portion 28 in the directions shown by arrow 27 (FIGS. 1 and 2a). The height adjustment mechanism may be manually operated, or may operate automatically or by input control. One example of a manual height adjustment mechanism may be a gas strut or a threaded height adjustment mechanism that is hand operated by a user. The height adjustment mechanism may also be motorized and/or automated so as to adjust height based on user input. If automated, the height adjustment mechanism may adjust the height of the tray 13 in relation to the base portion 28 using any suitable known motorized or automated control, which may be controlled, for example, by a user or technician 20 (FIG. 7) through an input unit 15 (FIG. 2a). Alternatively, for example, the height may be automatically adjusted based on a determined height of a user 20. Among other methods, the height of a user 20 may be determined based on an output from a single or multiple detection unit(s) 120 (FIG. 8) and/or based on information received from a worker profile/trend database 223 (FIG. 8).

Referencing FIGS. 2a and 2b, the tray 13 may be rotatable in relation to the base portion 28. The tray 13b may be operatively connected to a motor enabling the tray 13b to rotate in either direction denoted by arrow 25. The motor may be controlled via individual or multiple motor controllers, and the individual or multiple motor controllers may be in signal communication with the tray position adjustment unit 190 (FIG. 8). As discussed in further detail below, the tray position adjustment unit may thereby be controlled, for example, based on the work progress estimated by the work progress estimation unit 130 (FIG. 8). Alternatively, and/or in combination with the motor control, the tray 13b may be manually operated by a user.

Figure 3:
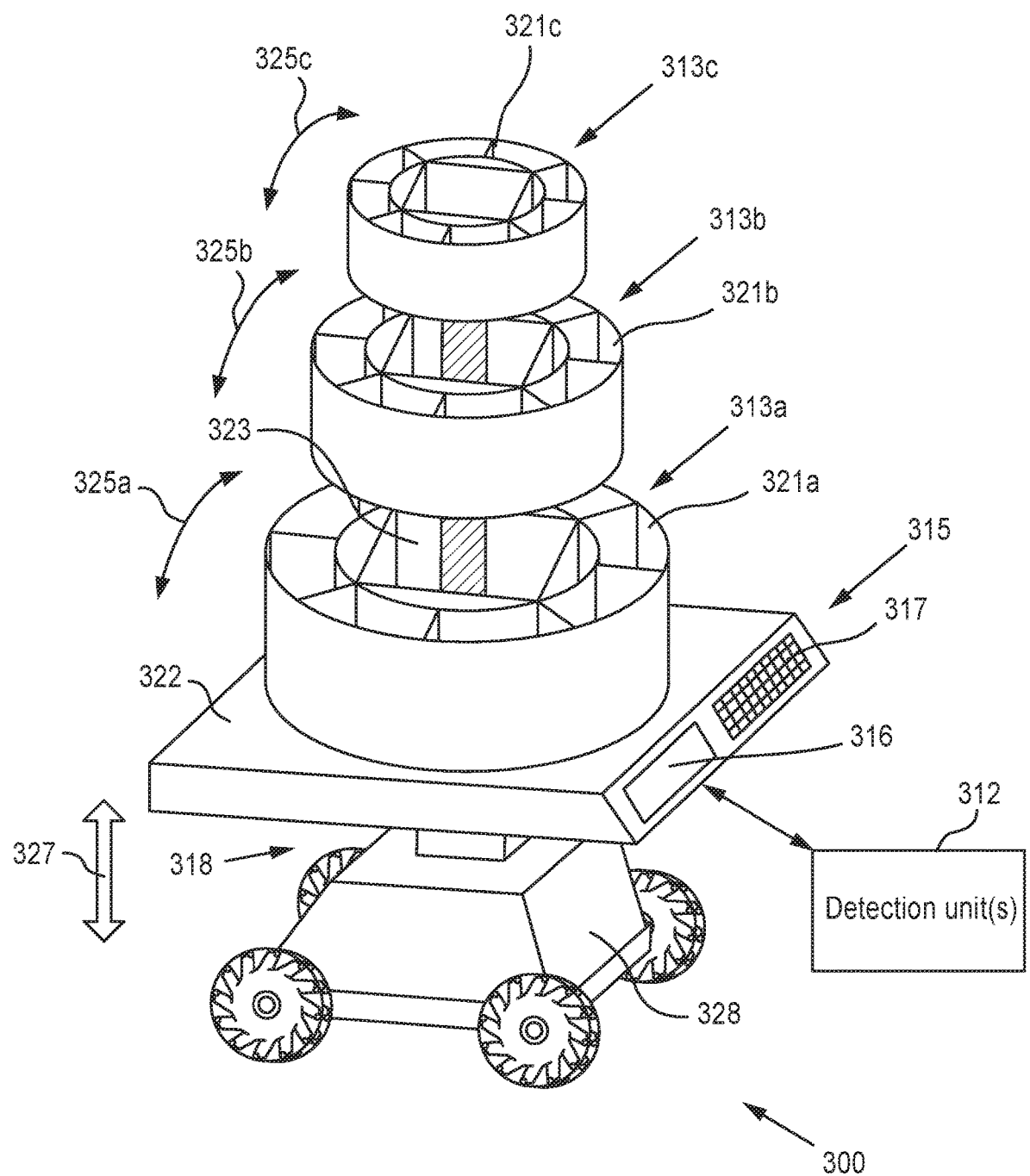
FIG. 3 is a perspective view of a support robot system in accordance with an aspect of the disclosure.

FIG. 3 shows an alternative support robot structure. The support robot 300 may include any of the aspects discussed in relation to FIGS. 1-2b. In addition, the support robot 300 may include a series of tool and/or part holders 313a-c. Each one of and/or all of the part holders 313a-c may also be interchangeably referred to herein as a tray or movable tray. As shown in FIG. 3, each of the tool holders 313a-c may include a single compartment or a plurality of dividers, for example. In one example, the tool and/or part holders 313a-c may be cylindrical and may include a plurality of compartments. Some examples of such compartments are shown by reference numbers 321a-c in FIG. 3. Further, each tool and/or part holder(s) 313a-c may be independently rotatable in relation to the base portion 328 of the support robot 300, such as in a single or multiple rotational directions 325a-c respectively. Each tool and/or part holder(s) 313a-c may vary in size or dimension from the others. For example, as shown in FIG. 3, a first tool and/or part holder 313c may have a first diameter that is smaller than a second tool and/or part holder 313b. Further, the second part and/or tool holder 313b may have a smaller diameter than a third part and/or tool holder 313a. Each one or multiple of the tool and/or part holder(s) 313a-c may further be removable and exchangeable for another tool and/or part holder either having the same or a different configuration from the replaced tool and/or part holder 313a-c. In one example, any one or a plurality of the first tray(s) 313a-c may be installed onto a support robot 300, and the one or plurality of first tray(s) 313a-c may be configured to store a first type of tool(s) and/or part(s). The one or plurality of first tray(s) 313a-c may be exchanged a single or a plurality of second tray(s) (not shown). The single or plurality of second tray(s) may be configured to store a second type of tool(s) and/or part(s). Accordingly, the support robot 300 may be adaptable to support the completion of a number of different tasks by a technician and/or user by exchanging trays to match each task.

The support robot may further include an input unit 315. The input unit may include any known method and apparatus enabling a user to receive and/or input information. For example, the input unit 315 may receive commands input from the user via a keyboard and/or key pad 317. Further, the input unit 315 may include a verbal command unit. The verbal command unit may include, for example, a microphone or other sound gathering device and a verbal recognition function configured to recognize and translate for use (e.g., in data gathering or operational inputs) received commands from a user. In one aspect, the user may select and input a specific user profile via the input unit 315. The input unit 315 may also include a screen or display 316 for displaying a graphical user interface (GUI) and information contained therein. For example, the GUI may be configured to display information related to the function of the support robot, which may be monitored, for example, by the user. In one example, the GUI may display work progress to a user. In another example, a user may override and/or update the estimated work progress via the input unit.

Figure 4:
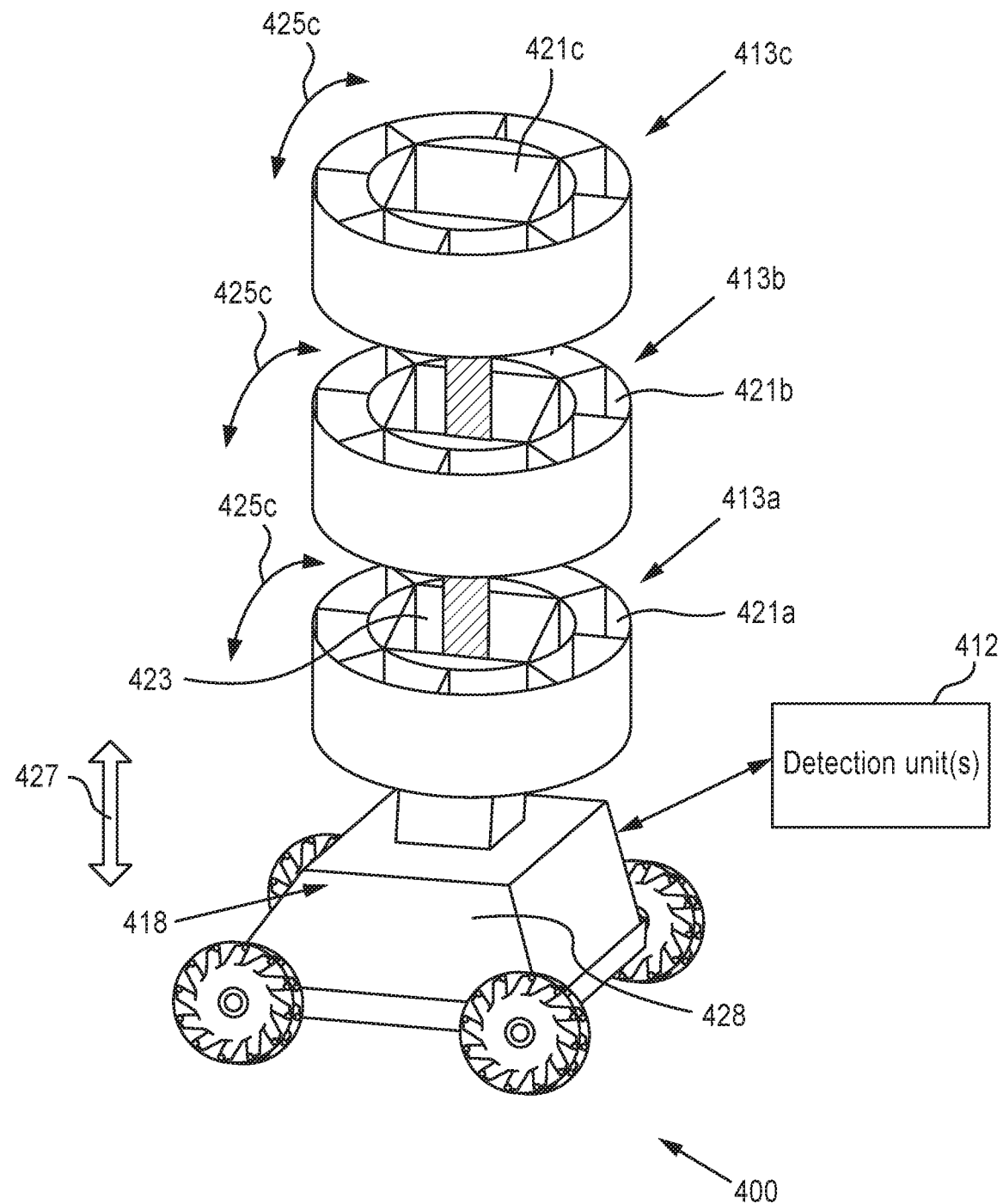
FIG. 4 is a perspective view of a support robot system in accordance with an aspect of the disclosure.

The support robot 300 may further include a height adjustment mechanism that may be capable of adjusting the height of the tray 313a and/or 313b and/or 313c in relation to the base portion 328 in the directions shown by arrow 327. The height adjustment mechanism may be manually operated, or may be operated by input control or automatically. One example of a manual height adjustment mechanism may be a gas strut or a threaded height adjustment mechanism that is hand operated by a user. The height adjustment mechanism may also be motorized and/or automated so as to adjust height based on user input. If automated, the height adjustment mechanism may adjust the height of one or a plurality of the trays 313a-c in relation to the base portion 328 using any suitable known motorized or automated control, which may be controlled, for example, by a user or technician 20 (FIG. 7) through an input unit 315 (FIG. 3). Alternatively, for example, the height may be automatically adjusted based on a determined height of a user 20. Among other methods, the height of a user 20 may be determined based on an output from a single or multiple detection unit(s) 120 (FIG. 8) and/or based on information received from a worker profile/trend database 223 (FIG. 8). Referencing FIG. 3, one of or a plurality of the trays 313a-c may be rotatable in relation to the base portion 328. The tray(s) 313a, 313b, and/or 313c may be operatively connected to a motor enabling the tray(s) 313a, 313b, and/or 313c to rotate in either direction denoted by arrow 325a-c respectively. The motor may be controlled via individual or multiple motor controllers, and the individual or multiple motor controllers may be in signal communication with the tray position adjustment unit 190 (FIG. 8). As discussed in further detail below, the tray position adjustment unit may be controlled, for example, based on the work progress estimated by the work progress estimation unit 130 (FIG. 4). Alternatively and/or in combination with the motor control, each one of or a plurality of the tray(s) 313a-c may be manually operated by a user.

FIG. 4 shows an alternative support robot structure that may share features with the support robot structure of FIG. 3. For example, while not shown in FIG. 4 for simplicity purposes, the support robot may include an input unit similar to input unit 315 shown in FIG. 3 and/or input unit 15 shown in FIG. 2a. Likewise, the input unit may be any known method and/or apparatus enabling a user to receive or input information. For example, the input unit may receive commands input from the user via a keyboard and/or key pad and/or may include a verbal command unit. The input unit may also include a screen or display for displaying a graphical user interface (GUI) and information contained therein, which may display information related to the function of the support robot and/or work progress to a user. In another example, a user may override and/or update the estimated work progress via the input unit.

The support robot 400 may include any of the aspects discussed in relation to FIGS. 1-3. In addition, the support robot 300 may include a series of tool and/or part holders 413a-c. Each one of and/or all of the part holders 413a-c may also be interchangeably referred to as a tray or movable tray. As shown in FIG. 4, each of the tool holders 413a-c may include a single compartment or plurality of dividers, for example. In one example, the tool and/or part holders 413a-c may be cylindrical and include a plurality of compartments. Some examples of such compartments are shown by reference numbers 421a-c respectively in FIG. 4. Further, each tool and/or part holder(s) 413a-c may be independently rotatable in relation to the base portion 428 of the support robot 400, such as in a single or multiple rotational directions 425a-c respectively. Each one or multiple of the tool and/or part holder(s) 413a-c may further be removable and exchangeable for another tool and/or part holder either having the same or a different configuration from the replaced tool and/or part holder 413a-c. In one example, any one or plurality of the first tray(s) 413*a-c* may be installed onto a support robot 300, and the one or plurality of first tray(s) 413*a-c* may be configured to store a first type of tool(s) and/or part(s). The one or plurality of first tray(s) 413*a-c* may be exchanged a single or plurality of second tray(s) (not shown). The single or plurality of second tray(s) may be configured to store a second type of tool(s) and/or part(s). Accordingly, the support robot 400 may be adaptable to support the completion of a number of different tasks by a technician and/or user by exchanging trays so as to match each task.

The support robot 400 may further include a height adjustment mechanism that may be capable of adjusting the height of the tray 413*a* and/or 413*b* and/or 413*c* in relation to the base portion 428 in the directions shown by arrow 427. The height adjustment mechanism may be manually operated, or may operate automatically or by input control. One example of a manual height adjustment mechanism may be a gas strut or a threaded height adjustment mechanism that is hand operated by a user. The height adjustment mechanism may also be motorized and/or automated so as to adjust height based on user input. If automated, the height adjustment mechanism may adjust the height of one of or a plurality of the trays 413*a-c* in relation to the base portion 428 using any suitable known motorized or automated control, which may be controlled, for example, by a user or technician 20 (FIG. 7) through an input unit 315 (FIG. 3). Alternatively, for example, the height may be automatically adjusted based on a determined height of a user. Among other methods, the height of a user may be determined based on an output from a single or multiple detection unit(s) 412 and/or 120 (FIG. 8) and/or based on information received from a worker profile/trend database 223 (FIG. 8). Referencing FIG. 4, one of or a plurality of the trays 413*a-c* may be rotatable in relation to the base portion 428. The tray(s) 413*a*, 413*b*, and/or 413*c* may be operatively connected to a motor enabling the tray(s) 413*a*, 413*b*, and/or 413*c* to rotate in either direction denoted by arrow 425*a-c* respectively. The motor may be controlled via individual or multiple motor controllers, and the individual or multiple motor controllers may be in signal communication with the tray position adjustment unit 190 (FIG. 8). As discussed in further detail below, the tray position adjustment unit may be controlled, for example, based on the work progress estimated by the work progress estimation unit 130 (FIG. 8). Alternatively and/or in combination with the motor control, each one of or a plurality of the tray(s) 413*a-c* may be manually operated by a user.

Figure 5:
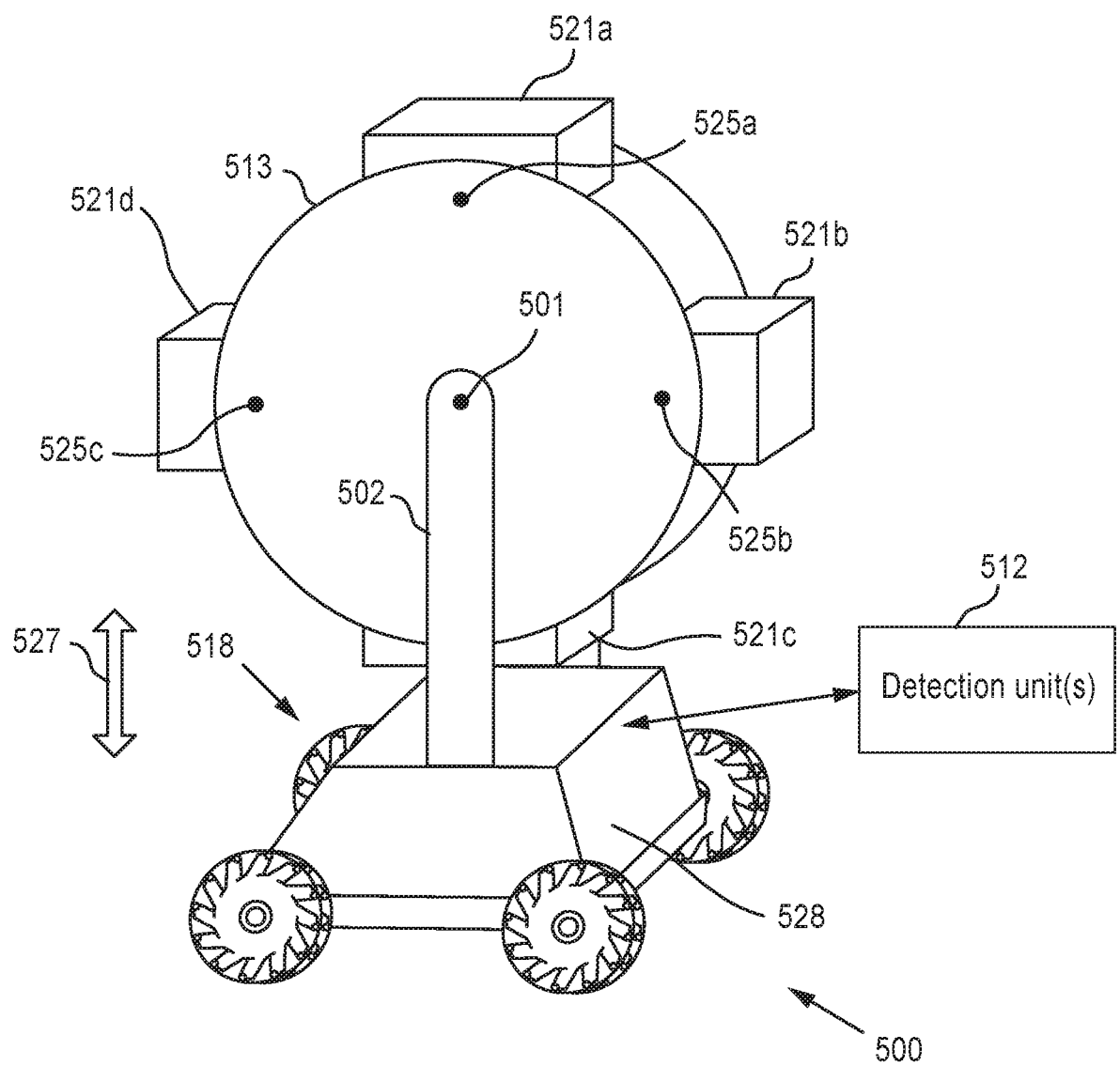
FIG. 5 is a perspective view of a support robot system in accordance with an aspect of the disclosure.

FIG. 5 shows an alternative support robot structure which may share features with the support robot structure of FIG. 3. For example, while not shown in FIG. 5 for simplicity purposes, the support robot may include a input unit similar to input unit 315 shown in FIG. 3 and/or input unit 15 shown in FIG. 2*a*. Likewise, the input unit may be any known method and/or apparatus enabling a user to receive or input information. For example, the input unit may receive commands input from the user via a keyboard and/or key pad and/or may include a verbal command unit. The input unit may also include a screen or display for displaying a graphical user interface (GUI) and information contained therein, which may display information related to the function of the support robot and/or work progress to a user. In another example, a user may override and/or update the estimated work progress via the input unit.

The support robot 500 may include any of the aspects discussed in relation to FIGS. 1-4. In addition, the support robot 500 may include a series of tool and/or part holders 521*a-d*. Each one and/or all of the part holders 521*a-d* may also be interchangeably referred to as a tray or movable tray. As shown in FIG. 5, each of the tool holders 521*a-d* may include a single compartment and may be rotatable mounted via pivots 525*a-c* to a rotatable carousel 513. The rotatable carousel 513 may rotate or may be rotatable about carousel pivot 501. While not shown in FIG. 5, each one or the plurality of the tool and/or part holder(s) 521*a-d* may include a single or multiple dividers, for example. Each one or multiple of the tool and/or part holder(s) 521*a-d* may further be removable and exchangeable for another tool and/or part holder either having the same or a different configuration from the replaced tool and/or part holder 521*a-d*. In one example, any one or a plurality of the first tray(s) 521*a-d* may be installed onto a support robot 400, and the one or plurality of first tray(s) 521*a-d* may be configured to store a first type of tool(s) and/or part(s). The one or plurality of first tray(s) 521*a-d* may be exchanged for a single or multiple second tray(s) (not shown). The single or multiple second tray(s) may be configured to store a second type of tool(s) and/or part(s). Accordingly, the support robot 500 may be adaptable to support the completion of a number of different tasks by a technician and/or user by exchanging trays so as to match each task.

The support robot 500 include mounting supports 502 configured to rotatably support carousel 512. The mounting supports may further include a height adjustment mechanism that may be capable of adjusting the height of the carousel 512 in relation to the base portion 528 in the directions shown by arrow 527. The height adjustment mechanism may be manually operated, or may be operated by input control or automatically. One example of a manual height adjustment mechanism may be a gas strut or a threaded height adjustment mechanism that is hand operated by a user. The height adjustment mechanism may also be motorized and/or automated so as to adjust height based on user input. If automated, the height adjustment mechanism may adjust the height of the carousel 513 in relation to the base portion 528 using any suitable known motorized or automated control, which may be controlled, for example, by a user or technician 20 (FIG. 7) through an input unit 315 (FIG. 3). Alternatively, for example, the height may be automatically adjusted based on a determined height of a user. Among other methods, the height of a user may be determined based on an output from a single or multiple detection unit(s) 512 and/or 120 (FIG. 8) and/or based on information received from a worker profile/trend database 223 (FIG. 8). Referencing FIG. 5, the carousel 513 may be rotatable relative to the base portion 413. The carousel 513 may be operatively connected to a motor enabling the carousel 513 to rotate changing the position of each of trays 521*a-d*. The motor may be controlled via individual or multiple motor controllers, and the individual or multiple motor controllers may be in signal communication with the tray position adjustment unit 190 (FIG. 8). As discussed in further detail below, the tray position adjustment unit may be controlled, for example, based on the work progress estimated by the work progress estimation unit 130 (FIG. 8). Alternatively and/or in combination with the motor control, the carousel 513 may be manually operated by a user.

Figure 6:
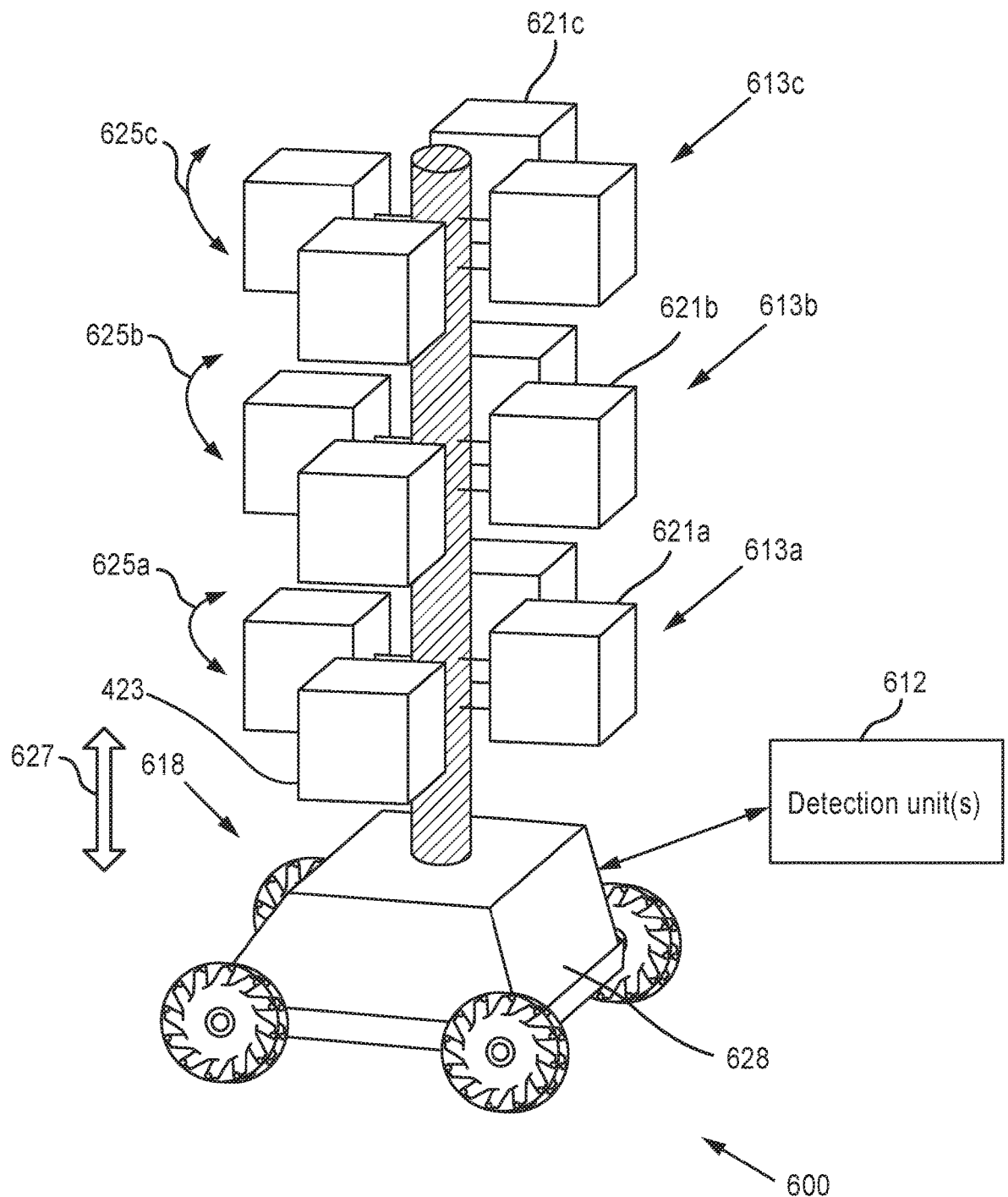
FIG. 6 is a perspective view of a support robot system in accordance with an aspect of the disclosure.

FIG. 6 shows an alternative support robot structure which may share features with the support robot structure of FIGS. 3-5. For example, while not shown in FIG. 6 for simplicity purposes, the support robot may include a input unit similar to input unit 315 shown in FIG. 3 and/or input unit 15 shown in FIG. 2*a*. Likewise, the input unit may be any known method and/or apparatus enabling a user to receive or input information. For example, the input unit may receive commands input from the user via a keyboard and/or key pad and/or may include a verbal command unit. The input unit may also include a screen or display for displaying a graphical user interface (GUI) and information contained therein, which may display information related to the function of the support robot and/or work progress to a user. In another example, a user may override and/or update the estimated work progress via the input unit.

The support robot 600 may include any of the aspects discussed in relation to FIGS. 1-3. In addition, the support robot 600 may include a series of rotatable tool and/or part holders 613a-c each having a plurality of bins 621a-c respectfully. Each one of and/or multiple of the rotatable tool and/or part holders 613a-c having a plurality of bins 621a-c may also be interchangeably referred to as a tray or movable tray. As shown in FIG. 6, each of the tool holders 613a-c may include a plurality of bins 621a-c, for example. In one example, each one or a plurality of the bins 621a-c may form a square or rectangular compartment with one open side. While not shown in FIG. 6, each of the plurality of bins 621a-c may include a single or multiple compartments. Further, each tool and/or part holder(s) 613a-c may be independently rotatable in relation to the base portion 628 of the support robot 600, such as in a single or multiple rotational directions 625a-c. Each one or multiple of the tool and/or part holder(s) 613a-c and/or bins 621a-c may further be removable and exchangeable for another tool and/or part holder and/or bin either having the same or a different configuration from the replaced tool and/or part holder 613a-c and/or bins 621a-c. In one example, any one or plurality of the first part and/or tool holders 613a-c and/or bins 621a-c may be installed onto a support robot 600, and the one or plurality of first part and/or tool holders 613a-c and/or bins 621a-c may be configured to store a first type of tool(s) and/or part(s). The one or plurality of part and/or tool holders 613a-c and/or bins 621a-c may be exchanged a single or plurality of second part and/or tool holders and/or bins (not shown). In one example, the single or plurality of second bins may be configured to store a second type of tool(s) and/or part(s). Accordingly, the support robot 600 may be adaptable to support the completion of a number of different tasks by a technician and/or user by exchanging trays so as to match each task.

The support robot 600 may further include a height adjustment mechanism that may be capable of adjusting the height of the part and/or tool holders 613a-c in relation to the base portion 628 in the directions shown by arrow 627. The height adjustment mechanism may be manually operated, or may be operated by input control or automatically. One example of a manual height adjustment mechanism may be a gas strut or a threaded height adjustment mechanism that is hand operated by a user. The height adjustment mechanism may also be motorized and/or automated so as to adjust height based on user input. If automated, the height adjustment mechanism may adjust the height of one or a plurality of the part and/or tool holders 613a-c in relation to the base portion 628 using any suitable known motorized or automated control, which may be controlled, for example, by a user or technician 20 (FIG. 7) through an input unit 315 (FIG. 3). Alternatively, for example, the height may be automatically adjusted based on a determined height of a user. Among other methods, the height of the user may be determined based on an output from a single or multiple detection unit(s) 612 and/or 120 (FIG. 8) and/or based on information received from a worker profile/trend database 223 (FIG. 8). Referencing FIG. 4, one or a plurality of the part and/or tool holders 613a-c may be rotatable in relation to the base portion 628. The part and/or tool holders 613a, 613b, and/or 613c may be operatively connected to a motor enabling the part and/or tool holders 613a, 613b, and/or 613c to rotate in either direction denoted by arrow 625a-c. The motor may be controlled via individual or multiple motor controllers, and the individual or multiple motor controllers may be in signal communication with the tray position adjustment unit 190 (FIG. 8). As discussed in further detail below, the tray position adjustment unit may be controlled, for example, based on the work progress estimated by the work progress estimation unit 130 (FIG. 8). Alternatively and/or in combination with the motor control, each one or a plurality of the part and/or tool holders 613a-c may be manually operated by a user.

Figure 7:
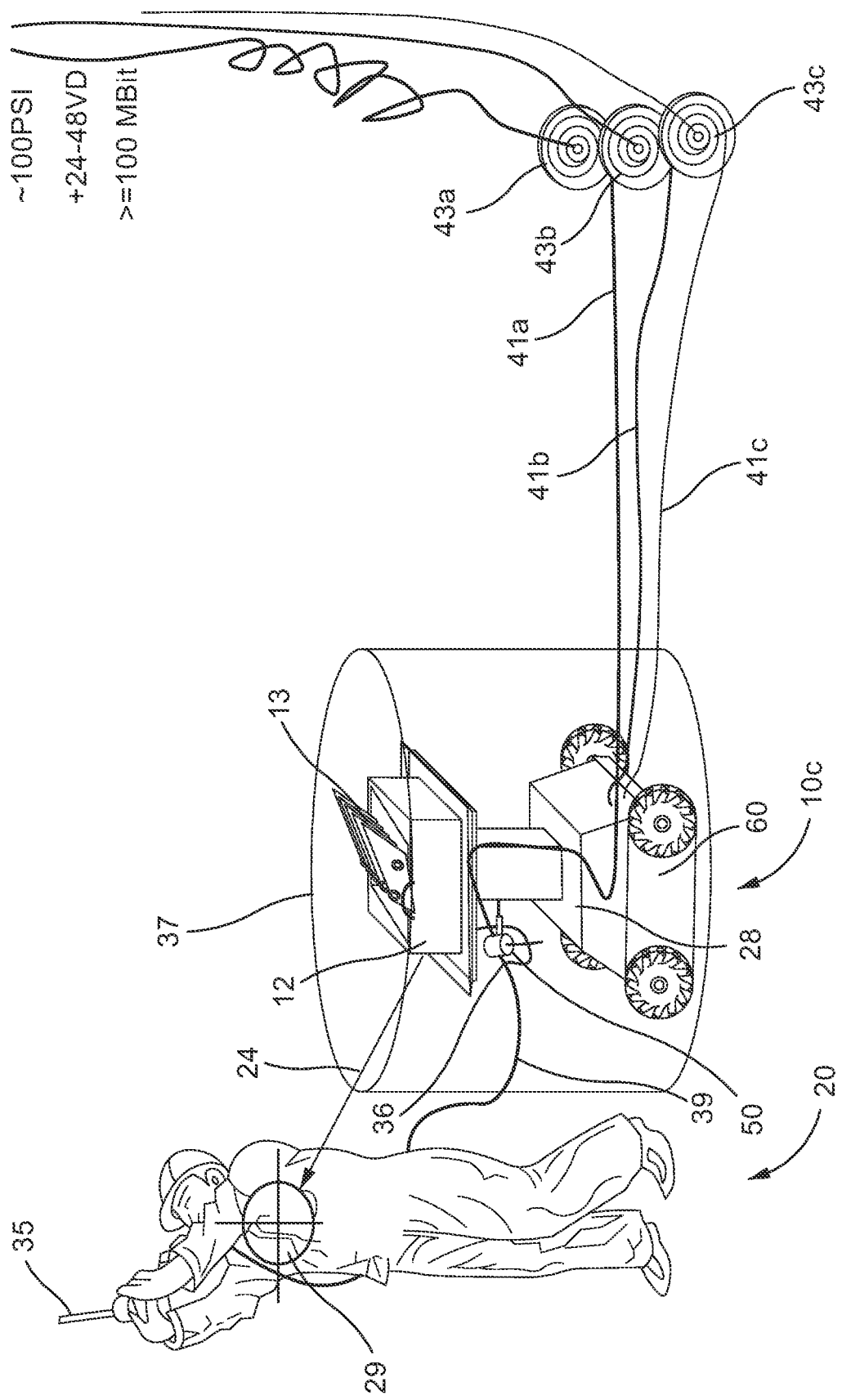
FIG. 7 is a perspective view of a support robot system in accordance with an aspect of the disclosure.
Figure 8:
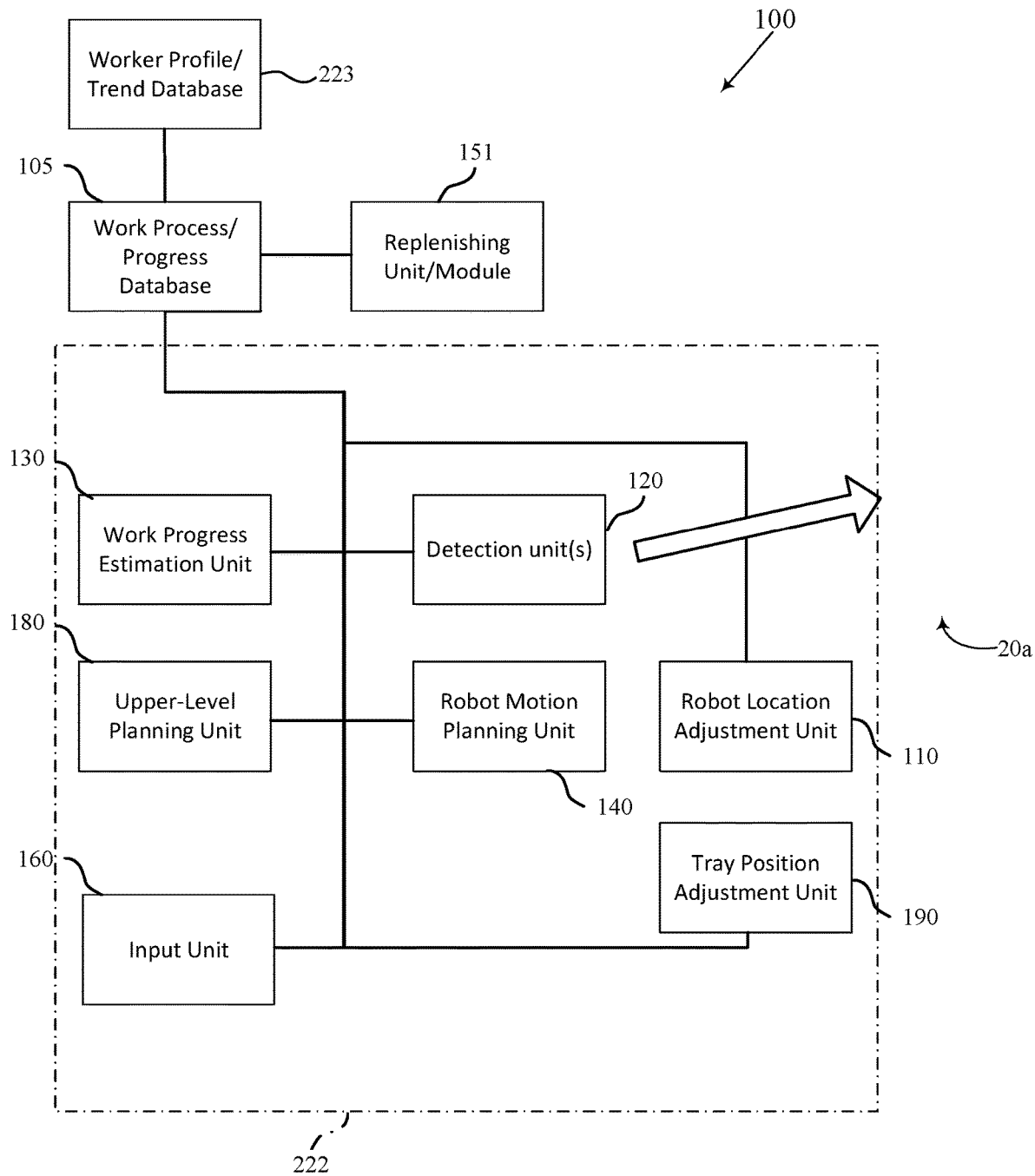
FIG. 8 is a block diagram of a control system in accordance with an aspect of the disclosure.

As shown in FIG. 7, the support robot 10 may further provide a connection point for one or more tethered connections 41a-c. The tethered connections 41a-c may comprise any one of or a combination of compressed air lines, welding gas lines, and/or electrical lines connected to respective air, welding gas, and/or electrical sources. The tethered connections 41a-c may be connected to each source via tethered source retraction mechanisms 43a-c, for example. Accordingly, the support robot 10 may provide any one of or a combination of an air source, welding gas source, and/or electrical source to a user or technician 20, for example. The support robot may further include a single or multiple connections 50 for connection of a tool 35 for use, for example, in conjunction with any of the aforementioned sources. For example, tool 35 may be an air tool requiring an air source. In one example method of operation, a user 20 may use the air tool 35 to complete a task, which may therefore necessitate the air tool 35 being connected to the robot via air line 39. Similarly, a second tool 50 that may have differing tethered support may further be provided on the support robot 10 in a position accessible to the user 20. Any number of tools and necessary sources may thereby be provided via the support robot 10 to provide convenience and quick access to each tool by the user 20.

As shown in FIGS. 2a and 3-6, any one of the aforementioned examples of support robots may further include and/or be in signal communication with at least one detection unit. As shown in FIG. 2a the detection unit 12 may, for example, include a single or series of sensors or other monitoring system for determining the distance from (e.g., see representative arrow 24 in FIG. 7) and/or a position (e.g., see representative target position 29) of a user 20. The detection may further detect a user motion or other signal. Further, the detection unit may determine a location of the user 20 in relation to a workpiece and/or may determine a tool 35 being used by a user. The detection unit may further detect and determine any hardware and/or parts that a user 20 has removed from tray 13. As discussed further below, any one of or a combination of the aforementioned determinations may be used to adjust the operation of the support robot 10. The detection unit may include any one of or a combination of sensors or detectors. For example, a complementary metal-oxide-semiconductor ("CMOS") or charge-coupled device ("CCD") cameras may be employed as sensors to detect the environment, such as by recognizing various items. In one or more aspects, the support robot 10 may, for example, use a pair of stereo cameras that may be rotated 45 degrees with respect to the general direction of travel of the robot 10. One or more aspects of the disclosure may utilize a single camera, and in other aspects a pair of cameras horizontally mounted, vertically mounted or mounted at any angle between horizontal or vertical (between 0 and 90 degrees) with respect to the horizontal may be utilized. One example of using multiple cameras having an angled axis feature that may be used in accordance with aspects of the present disclosure is described in U.S. Patent Publication Number 2006/0012673 to Koselka et al., the entire contents of which are incorporated herein by reference.

Further, the detection unit 12 may include at least one laser scanner, which may be used as an alternative to or in combination with the aforementioned cameras. The laser scanner may be or include, for example, a Light Detection and Ranging ("LIDAR") device. In an aspect, a one dimensional LIDAR device may be used. A one-dimensional LIDAR device may measure a detected distance and received signal strength of reflected light from its emissions. Although more complicated two-dimensional and three-dimensional LIDAR devices are available and may be used in accordance with aspects of the present disclosure, a one-dimensional LIDAR device may also be used. The laser scanner may be rotatably mounted to the base portion 28 and/or a support portion 22 supporting tray 13. The laser scanner may scan areas around the support robot 10 by projecting a light beam at multiple angles. Accordingly, the mounting location of the laser scanner may preferably be in a forward portion of the support robot 10 at a height that provides as unobstructed a path as possible to the scanned areas about the support robot 10. For example, to increase range of coverage, the laser scanner may be mounted at a height greater than a height of wheels 25*a-c*. The laser scanner may be rotatably mounted to the support robot 10. For example, the laser scanner 10 may be mounted to a servo motor via a rotatable drive pulley. The LIDAR device may also may also include a laser scanner controller for electronically controlling the laser scanner and the servo motor. The laser scanner controller may reciprocally rotate the laser scanner along an arc centered in the direction of motion of the support robot 10, for example. That is, the laser scanner may sweep an arc in a first direction, then the servo motor may reverse direction and sweep an arc in the opposite direction.

The detection unit 12 may further include any suitable number of tray sensors, at least some of which may, for example, be located in the tray 13. The tray sensors may include one or more sensors that may detect the addition or removal of components and/or tools from each compartment, e.g., 21 and 23 (FIGS. 2*a* and 2*b*), of the tray. In one example, the tray may be mounted to or otherwise interoperate with a load cell or weight sensor. The detection unit 12 may also or alternatively include, for example, one or more photodiodes or photosensors within the tray to determine when a user removes an item from the tray. Optionally, the tray may further include a light emission device that may be used in conjunction with the photodiodes or photosensors. The photodiodes or photosensors of the detection unit 12 may detect a change in light received from the light emission device when a user removes any of the aforementioned items from the tray 13, for example. The determination that a tool and/or component is removed may be used to determine and/or estimate work progress, for example. While the detection unit 12 and features associated with the detection unit 12 are described in relation to FIG. 2*a*, it is noted that any of the features described herein in relation to FIG. 2*a* are applicable and may be used with the additional examples of support robots 300, 400, 500, and/or 600 and the respective detection units 312, 412, 512, and/or 612 shown in FIGS. 3-6, respectively.

Figure 10:
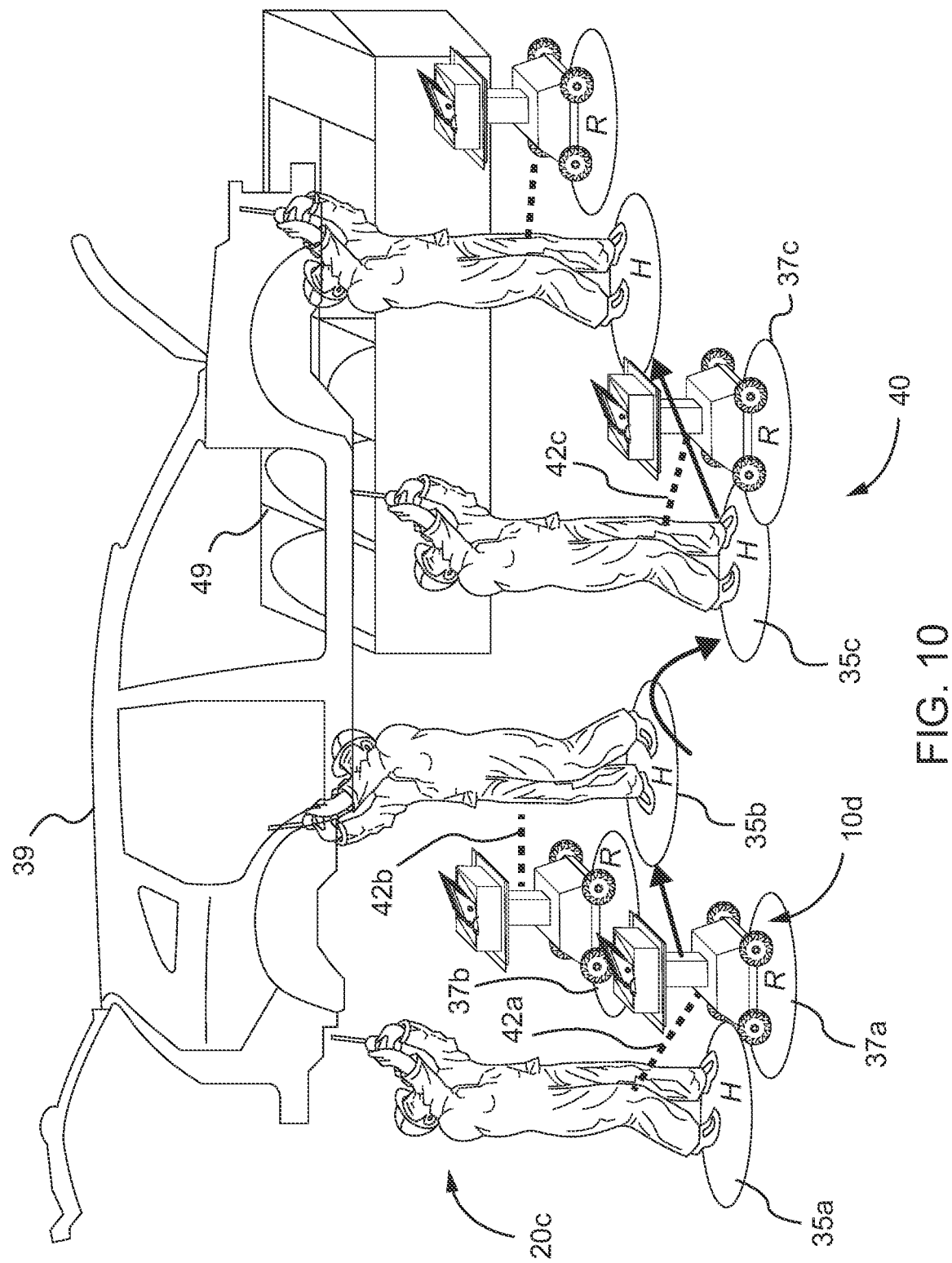
FIG. 10 is a perspective view of several possible orientations of a support robot in accordance with one aspect of the disclosure.

In addition, the support robot 10 may include a base-station mounting and/or docking portion (not shown). The support robot 10 robot may dock on a base-station, to charge and/or to receive updates and/or to have the aforementioned components and hardware and/or tools replaced or exchanged via a component and/or hardware supply replenishing unit 49 (FIG. 10). In one example, the base-station may include a wired or wireless communication feature for providing such updates, providing communication, adding or removing hardware functionality, and other purposes. The base station may also include features for providing inductive charging, which may, for example, allow the support robot to locate itself on or near the base station and charge without physically connecting to the base station through a hard-wired connection. While the base-station features are described in relation to FIG. 2*a*, it is noted that any of the features described herein in relation to support robot 10 of FIG. 2*a* are applicable and may be used with the additional examples of support robots 300, 400, 500, and/or 600 shown in FIGS. 3-6, respectively. FIG. 8 is a block diagram illustrating various features of a control and operation system for an example support robot according to one aspect of the disclosure. The system 100 may include a single or plurality of detection units 120, a robot motion planning unit 140, a work progress estimation unit 130, and upper-level planning unit, and an input unit. The system may also include a robot location adjustment unit 110 and a tray position adjustment unit 190. As shown in FIG. 8, the aforementioned features represented by box 222 of the control and operation of the support robot may occur within each support robot 10. As an alternative, one or combination of the aforementioned features of control and operation may occur remotely via signal communication with one or more support robot(s) 10. The control and operation system may further include a work process/progress database 105 and a replenishing unit/module 151. Further, the system 100 may include a worker profile/trend database 223. In one aspect, the work process/progress database 105, replenishing unit/module 151, and/or a worker profile/trend database 223 may be located remotely while being in signal communication with the control and operations represented by 222 of the system.

As shown in FIG. 8, the system 100 includes a robot location adjustment unit 110 and tray position adjustment unit 190 for adjusting the positional orientation of the robot and a tray in relation to a worker 20 for delivering objects such as parts and tools, for example. The system 100 further includes at least one detection unit 120 for measuring the position of a worker 20*a*; a work progress estimation unit 130 for estimating the work progress and providing update data to the robot location adjustment unit 110 and the tray position adjustment unit 190 based, for example, on the parts and/or tools required for a specific task performed by the worker 20 during the estimated work progress. The system 100 may further include a motion planning unit 140 for controlling the robot location adjustment unit 110 and/or the tray position adjustment unit 190. Among other functions, the work progress estimation unit 130 may estimate the work progress based on data input from the detection unit(s) 120, which may be measured, for example, by referring or comparing to the data concerning various subparts of each work procedure. The work progress estimation unit 130 may thereby further determine which parts and tools are necessary for the next task when the work is estimated to have advanced to the next task. Among other functions, the motion planning unit 140 may plan the motion of the robot location adjustment unit 110 and/or the tray position adjustment unit 190 in accordance with the work progress estimated and the objects and/or operations identified by the work progress estimation unit 130, and thus may update and control the robot motion planning unit 140 robot location adjustment unit 110 and/or the tray position adjustment unit 190.

The work progress estimation unit 130 may use known and/or pre-programmed algorithms and/or artificial intelligence ("AI") or machine learning to estimate work progress of a user 20 based on input received from a single or multiple detection unit(s) 120. Further, the work progress estimation unit 130 may predict work progress based on output from the detection unit(s) 120 and stored data in a work process and/or progress database 100. The work process and/or progress database 105 may include programmed information and/or received data, such as trend data observed and collected from a single or multiple support robots. Further, the work process and/or progress database 105 may include work progress related data stored in a work progress data repository. At least one example of a method of estimating work progress of a user is disclosed in U.S. Pat. No. 8,682,482 to Kosuge et al., the entire disclosure of which is incorporated by reference herein.

Further, the work estimation progress estimation unit 130 may utilize user data stored in a worker profile and/or trend database 223 for a particular user 20. For example, the method or factors involved in work progress estimated by the work progress estimation unit 130 may vary from one user to the next based on data stored in the worker profile and/or trend database 223. Accordingly, the robot motion planning unit 140 and robot location adjustment unit 110 may adjust variables such as the location of the support robot 10 (FIGS. 1 and 2) in relation to a user 20, and/or the tray position adjustment unit may adjust the rotation of the tray 13 (FIGS. 1 and 2) based on a user's preferences and/or working habits, for example. Thus, the adjustment of the height adjustment mechanism 18 (FIG. 1) may be automatically or otherwise adjusted based not only on the estimated work progress, but also user specific data. The system may further include an upper level planning unit 180 for updating at least one of a work process and progress database 223 and/or a worker profile and trend database 105, for example, based on at least one of input from the input unit 160 (e.g., an input unit 15 at support robot 10) and/or input from the detection unit 120.

The input unit 160 may include any known method and apparatus enabling a user to receive and/or input information. One example of an input unit is shown as reference 15 in FIG. 2a. For example, the input unit 160 may receive commands input from the user and may update the work progress estimation unit 130, the upper-level planning unit 180, and/or the robot motion planning unit 140 based an input from the user. Further, the input unit 160 may include a verbal command unit. The verbal command unit may include, for example, a microphone or other sound gathering device and a verbal recognition function configured to recognize and translate for use (e.g., in data gathering or operational inputs) received commands from a user.

In one aspect, the user may select and input a specific user profile via the input unit 160. The input unit 160 may also include a screen for displaying a graphical user interface ("GUI") and information contained therein. For example, the GUI may be configured to display information related to the function of the support robot, which may be monitored, for example, by the user. In one example, the GUI may display work progress to a user. In another example, a user may override and/or update the estimated work progress via the input unit 160. Among other functions, the input unit 160 may also be used for input to control the height of tray 13 (FIG. 1) in relation to the base portion 23 (FIG. 1) of the support robot, for example.

The system 100 may further include a replenishing unit/module 151. The replenishing unit/module may determine hardware components, parts, and/or tools and/or the number components and/or parts that are required for each specific task. The replenishing module, may determine when a number of components and/or parts within tray 13 (FIGS. 1-2b) is insufficient for the task to be completed by a user. In one example, the replenishing unit/module 151 may cause the input unit to display and/or recommend replacement of the tray. In one aspect, the replenishing/unit module may instruct the support robot to receive additional components and/or parts from a component and/or hardware supply replenishing unit 49 (FIG. 10).

Figure 9:
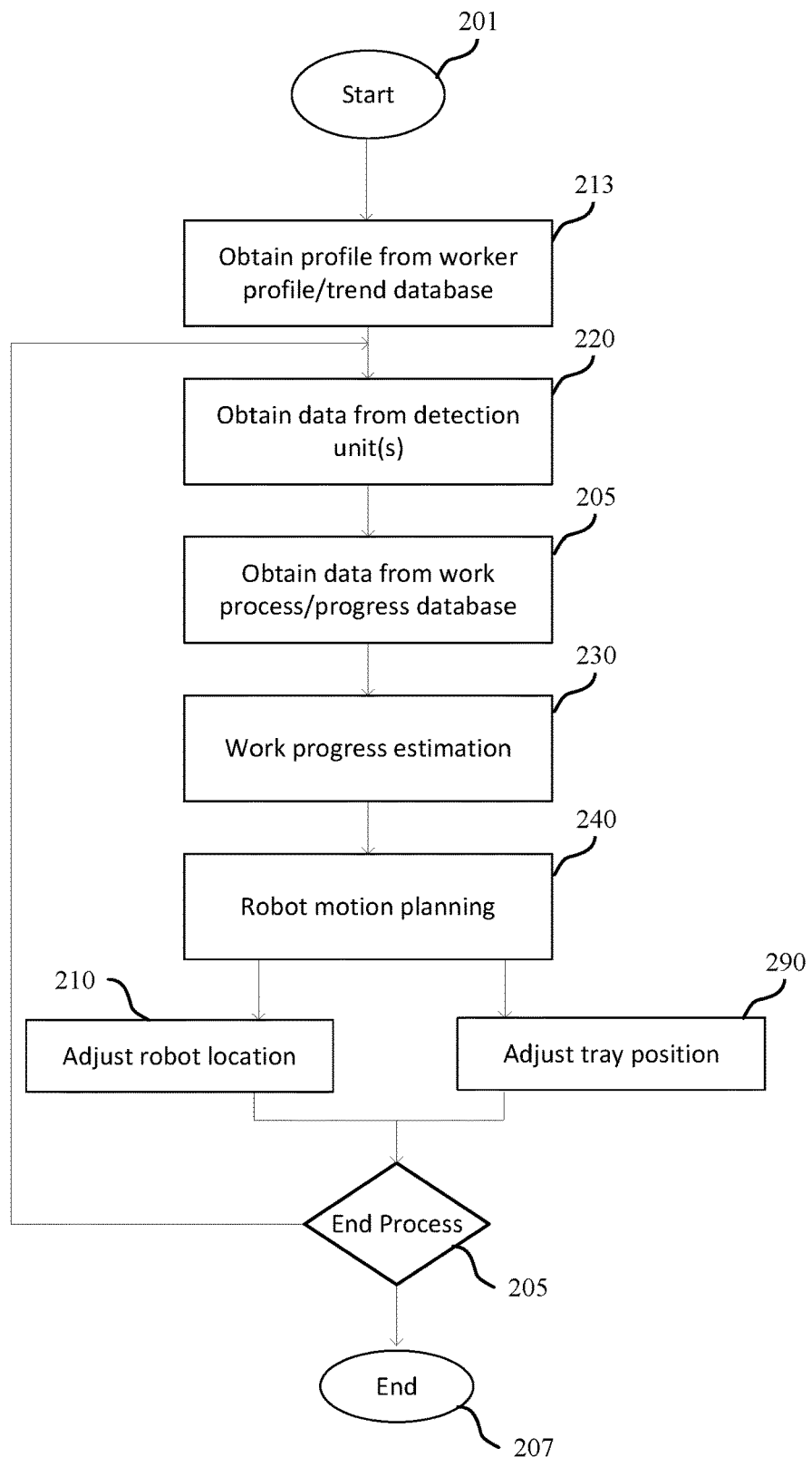
FIG. 9 is a diagram for outlining a process in accordance with one aspect of the disclosure.

An example process performed by the system of FIG. 8 will be described with reference to the flowchart in FIG. 9. At the start of an operation 201, the system 100 may obtain a profile from a worker profile/trend database in step 213. The worker profile/trend database may be selected by a user, for example by input via the input device (e.g., 15 in FIG. 2a). In another example, the system may use information received from a detection device (e.g., 120 in FIG. 8) to automatically identify a user based on the output from the detection unit(s). Once a user profile is selected, the system may obtain data from the detection unit(s) in step 120 and obtain data from a work process/progress database (e.g., 105 in FIG. 8) based on at least one of the user profile and the data received from the detection unit(s). In step 240, the system may plan motion of and adjust the robot location 210 and/or the tray position 290 based on an estimated work progress determined in step 230. A work progress estimation unit (e.g., 130 in FIG. 8) may thereby further determine which parts and tools are necessary for the next task when the work is estimated to have advanced to the next task based on an estimated work progress in step 230. Further, among other functions, a motion planning unit (e.g., 140 in FIG. 8) may plan the motion of the robot location adjustment unit (e.g., 110 in FIG. 8) and/or the tray position adjustment unit (e.g., 190 in FIG. 8) in accordance with the work progress estimated and the objects and/or operations identified by the work progress estimation unit at step 230, and thus may update and control the robot. This series of steps may be repeated until the system determines that the task has been completed at step 207. Further, in each of the aforementioned steps, a worker/profile trend database (e.g., 223 in FIG. 8) and/or a work process/progress database (e.g., 105 in FIG. 8) may be updated based on output data from the system during the example process shown in FIG. 9.

One example of several movements and a positional relationships of the support robot in relation to a user and/or technician 20c is representatively shown in graphical form in FIG. 10. For example, support robot 10d shown in FIG. 10 includes similar components and operational features as shown and discussed in relation to FIGS. 1-9. In one example, a user while carrying out a first operation 20a may start a first task on workpiece 39 (e.g., a vehicle). The user during operation 20a may stand in position 35a while completing the first operation. Accordingly, the work progress estimation unit 130 (FIG. 8) may estimate the work progress based on a detected position 42a of the user via data output from the measuring unit(s) 120 (FIG. 8) and/or stored data in the work progress/process database 100 (FIG. 8) and/or the worker profile/trend database 223 (FIG. 8) related to work procedures. The work progress estimation unit 130

(FIG. 8) and robot motion planning unit 140 (FIG. 8) may determine a suggested location 37a of the support robot 10 in relation to the user 20c and/or determine the parts and tools necessary for the work activity underway or predicted to become underway, such as based on user history, work progress, typical worker data/operations, and/or other information stored in the worker profile profile/trend database and/or the work process/progress database. Accordingly, the motion planning unit 140 (FIG. 8) may instruct the robot location adjustment unit to position the support robot while positioned for monitoring first operation 10a in position 37a. The robot location adjustment unit may, for example, a single or multiple motor controller to control motors associated with each wheel of the support robot. Each motor associated with each wheel of the support robot may be configured to convert a series of input pulses received from the motor controller(s) (for example, square wave pulses) relating to movement instructions received from the motion planning unit 140, for example, into precisely defined increments in the shaft position change of each motor relative to the motor body.

Further, the work progress estimation unit 130 may further predict each upcoming task and/or the series of tasks to be completed and instruct the tray position position adjustment 190 (FIG. 8) unit to timely adjust and/or rotate the tray 13 (FIG. 1) to each appropriate position so that tools and/or components within one or more of the compartments 21 (FIG. 1) are easily accessible by user specific to the task. As shown in FIG. 8, once a user completes a task, for example, the user while carrying out a next operation 20b may next reposition to position 35b. Based on the motion of the user and/or a predicted next task to be completed by the user, the motion planning unit 140 (FIG. 8) may instruct the robot location adjustment unit 110 (FIG. 8) to position the support robot 10 in position 37b. Further, the work progress estimation unit 130 (FIG. 8) may predict the task to be completed and/or the series of tasks to be completed and instruct the tray positon position adjustment 190 (FIG. 8) unit to adjust and/or rotate the tray 13 (FIG. 1) to a second position different from the first position so that tools and/or components within one or more of the compartments 21 (FIG. 1) are easily accessible by user while carrying out the operation 20b. A similar process may be completed for a variety of tasks and positions of a user. For example, a similar process may result in the support robot automatic positioning to location 37c for a task to be completed with a user in position 35c, for example, and so on.

Figure 11:
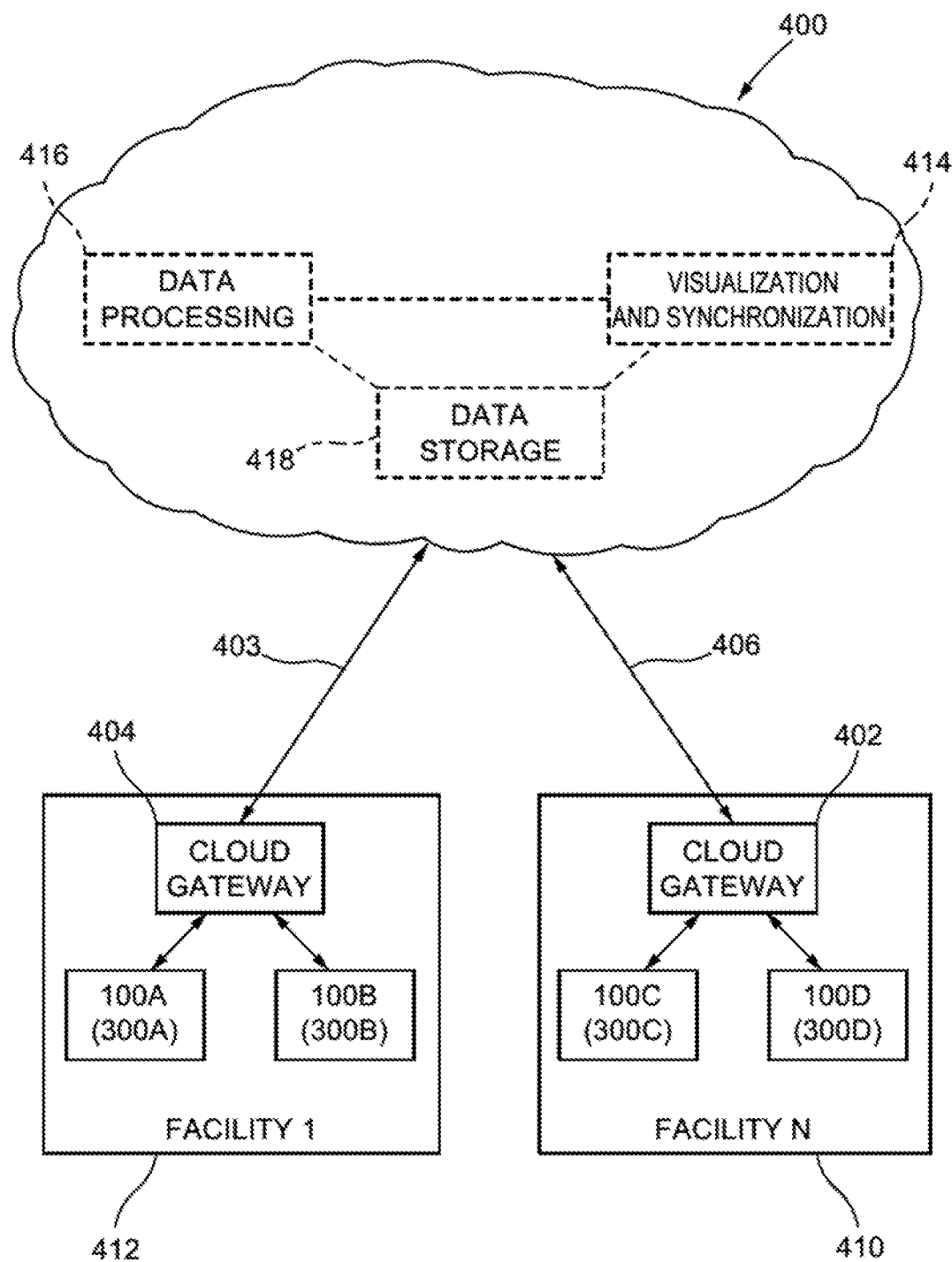
FIG. 11 is an example cloud based system in accordance with an aspect of the disclosure.

Cloud based services may be used to implement one or more aspects of disclosure. In one aspect, cloud based services may be used to implement one or more of the functions and operations discussed with regard to FIGS. 8 and 9. As shown in FIG. 11, one or more industrial facilities 410 and/or 412 may include a number of support robots 100A-100D (e.g., an example of each of which may be one or more robot shown in FIGS. 1-3). Each of the support robots 100A, 100B, 100C, and/or 100D may include elements of a single or plurality of the systems discussed above with reference to FIGS. 8 and 5. According to one or more aspects of this disclosure, a plurality of support robots 100A, 100B, 100C, and/or 100D may communicate with a cloud-based platform, such as via a network (e.g., the Internet or an intranet) to leverage cloud-based applications. For example, the support robots 100A, 100B, 100C, and/or 100D may be configured to discover and interact with cloud-based computing services 400 hosted by a cloud platform. The cloud platform may include any suitable infrastructure that allows shared computing services (e.g., 414, 416, 418) to be accessed and utilized by cloud-capable devices. The cloud platform may comprise a public cloud accessible via the Internet by devices having Internet connectivity and appropriate authorizations to utilize the services, for example. Alternatively, the cloud may comprise a private cloud operated internally by the enterprise, for example. An example private cloud can comprise a set of servers hosting cloud services and residing on a corporate network protected by a firewall.

Cloud services may include, but are not limited to, data storage 418, data processing 416, control applications (e.g., applications that can generate and deliver control instructions to support robots 100A, 100B, 100C, and/or 100D based on analysis of real-time system data or other factors), visualization applications 414 (e.g., for generating a GUI and/or graphical representation of data), reporting applications, notification services, and/or other such applications. For example, in a cloud based system, data storage from either of a worker profile/trend database (e.g., 223 in FIG. 8) and a work process/progress update database (e.g., 105 in FIG. 8) may be cloud based. Further, in another aspect that may be used in combination with the abovementioned aspects, at least one system may include local storage (e.g., as shown by reference 300 in FIG. 11). Accordingly, the cloud service may function to provide data processing, for example, while storage of data may occur at one or more of support robots 100A, 100B, 100C, and/or 100D. As another alternative, each support robot may include local storage, while a cloud service 400 may be implemented to archive data and/or to store processed data, for example.

If the cloud platform is a web-based cloud, support robots 100A, 100B, 100C, and/or 100D at the respective industrial facilities 412 and 410, may, for example, interact with cloud services 400 via the Internet. In an example configuration, support robots 100A, 100B, 100C, and/or 100D may access the cloud services 400 through separate cloud gateways 404 and 402 at the respective industrial facilities 412 and 410, where the automation systems 100A, 100B, 100C, and/or 100D connect to the cloud gateways 404 and 402 through a physical, wireless local area network, and/or radio link. In another example configuration, the industrial devices may access the cloud platform directly using an integrated cloud interface.

Providing each support robot with cloud capability may offer a number of advantages particular to industrial automation. For example, cloud-based storage offered by the cloud platform may be easily scaled. Moreover, multiple industrial facilities at different geographical locations may migrate their respective work related data to the cloud for aggregation, collation, collective analysis, and enterprise-level reporting, without the need to establish a private network among the facilities. Support robots 100A, 100B, 100C, and/or 100D having smart configuration capability, for example, may be configured to automatically detect and communicate with the cloud platform 400 upon installation at any facility, simplifying integration with existing cloud-based data storage, analysis, or reporting applications used by the enterprise. In another example implementation, cloud-based diagnostic applications may monitor the health of respective support robots and/or their associated industrial devices across an entire plant, or across multiple industrial facilities (e.g., Faculty N, shown as reference 410) that make up an enterprise. The cloud platform may allow software vendors to provide software as a service, removing the burden of software maintenance, upgrade, and backup from customers. It is noted that while two facilities are shown in FIG. 7, it is understood that the current disclosure is applicable to any number of facilities. These industrial cloud computing applications are only intended to be examples, and the systems and methods described herein are not limited to these particular implementations.

Figure 12:
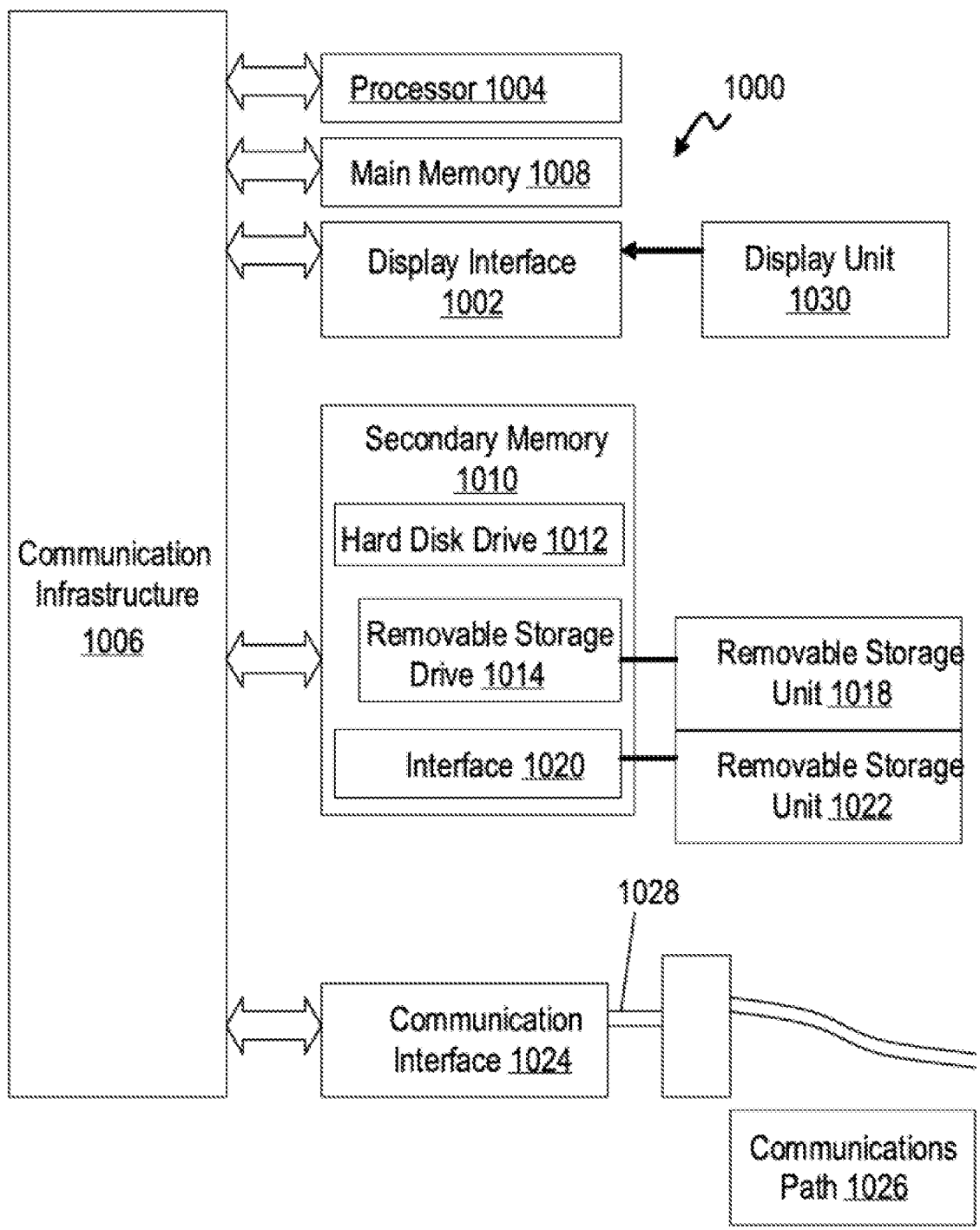
FIG. 12 illustrates an example computer system for an electronic system in accordance with an aspect of the disclosure.

Various aspects of the abovementioned control of the support robot and various system features shown and described in relation to FIGS. 1-7 may be implemented using hardware, software, or a combination thereof and may be implemented in one or more computer systems or other processing systems. In an aspect of the present disclosure, features are directed toward one or more computer systems capable of carrying out the functionality of the data processing disclosed above. An example of such a computer system 1000 is shown in FIG. 12.

Computer system 1000 includes one or more processors, such as processor 1004. The processor 1004 is connected to a communication infrastructure 1006 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., that is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, that allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs).

Figure 13:
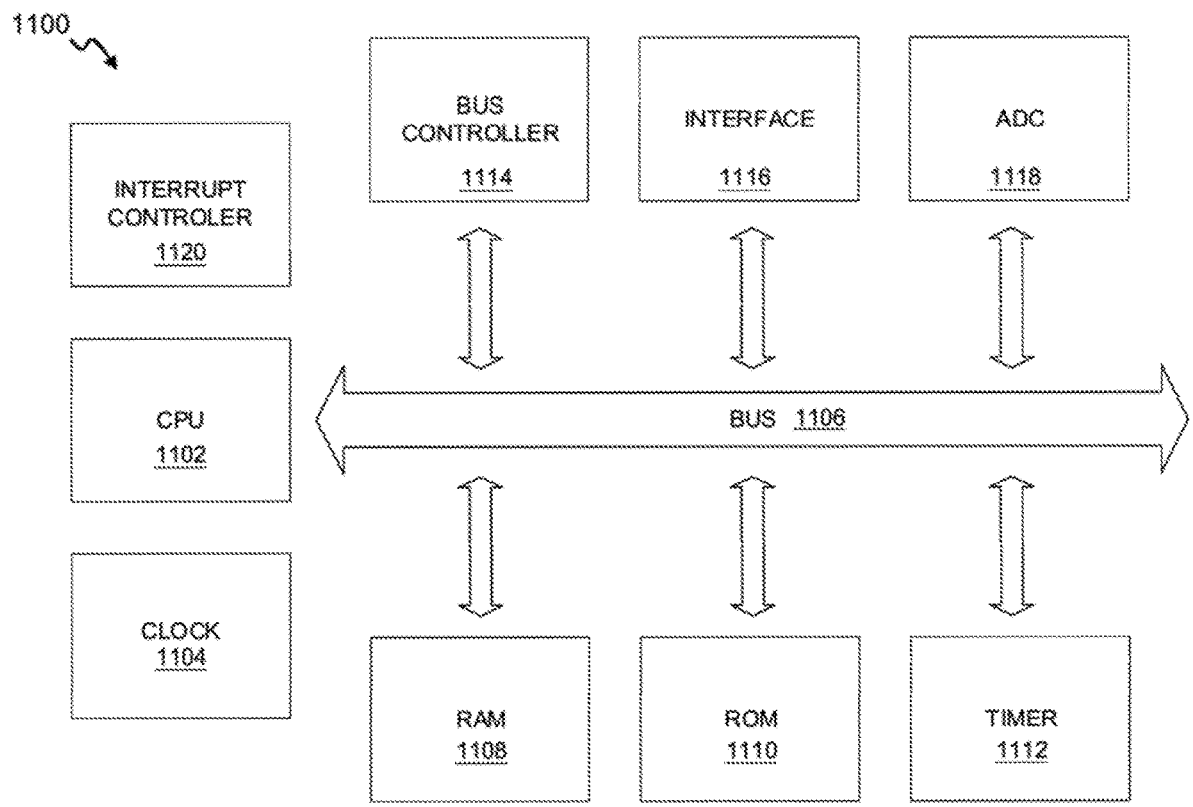
FIG. 13 is an example microcontroller in accordance with an aspect of the disclosure.

In some implementations, one or more microcontrollers may be implemented for carrying out certain features of the present disclosure, such as control features contained within the robot 10 and system 100 of FIGS. 1-4. An example of such a microcontroller 1100 is shown in FIG. 13. The microcontroller 1100 includes a CPU 1102, RAM 1108, ROM 1110, a timer 1112, a BUS controller, an interface 1114, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU to suspend CPU operations. The interrupt controller 1120 may transmit an interrupt signal to the CPU when an event requires immediate CPU attention.

The RAM 1108 may include one or more SRAM, DRAM, SDRAM, DDR SDRAM, DRRAM or other suitable volatile memory. The ROM 1110 may include one or more PROM, EPROM, EEPROM, flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes BUS usage within the microcontroller 1100. The ADC 1118 allows the microcontroller 1100 to send out pulses to signal other devices.

The interface 1116 is an input/output device that allows the microcontroller 1100 to exchange information with other devices. In some implementations, the interface 1116 may include one or more parallel port, a serial port, or other computer interfaces.

Figure 14:
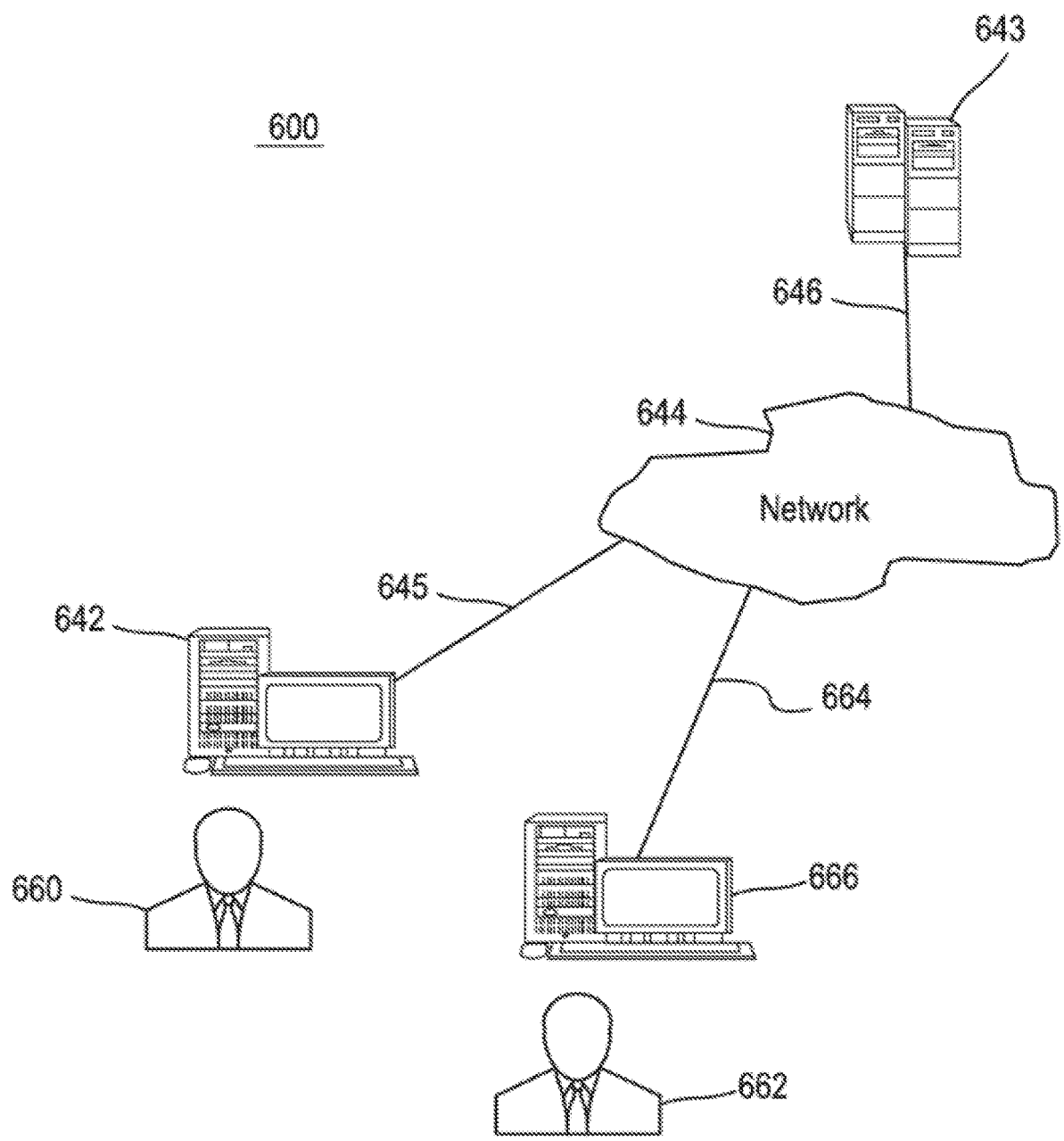
FIG. 14 is a block diagram of various example system components according to one aspect of the disclosure.

FIG. 14 is a block diagram of various example system components, in accordance with another example implementation of various features on a network. FIG. 11 shows various features of a communication system 600 usable in accordance with aspects described herein. The communication system 600 includes one or more accessors 660, 662 (also referred to interchangeably herein as one or more "users") and one or more terminals 642, 666. For example, terminals 642, 666 can include the robot 10 and/or system shown in FIGS. 1-10 or by other users at other locations remote from the robot 10 and/or system. In one aspect, data for use in accordance with aspects described herein is, for example, input and/or accessed by accessors 660, 662 via terminals 642, 666, such as robots, personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the above-mentioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A support robot for providing at least one selected from a group consisting of a tool, a part, a component, an electrical supply, a welding gas supply, and an air supply, the robot comprising:
   a detection unit for detecting a motion or other signal;
   a motion planning unit for producing data for controlling the motion of the robot based on an input received for the detected motion or other signal by the detection unit; a work progress estimation unit for estimating a work progress of a user based on the input received for the detected motion or other signal by the detection unit and work progress related data stored in a work progress data repository; and
   a robot location adjustment unit, wherein the robot location adjustment unit adjusts a location of the robot based on produced data received from the motion planning unit;
   wherein the work progress estimation unit is in operative communication with a user profile and trend database having a plurality of user profiles stored therein, wherein the work progress estimation unit alters at least one of the motion of the robot and a motion of a movable tray based on a selected one of the plurality of user profiles.

2. The support robot of claim 1, further comprising a moveable tray rotatable about a first axis, wherein the movable tray is configured to rotate based on an output from the work progress estimation unit.

3. The support robot of claim 1, wherein the robot location adjustment unit is in operative communication with a motor controller, wherein the motor controller controls at least one motor for moving the robot.

4. The support robot of claim 1, wherein the robot location adjustment unit is in operative communication with at least one motor controller, wherein the at least one motor controller controls a plurality of motors, where the plurality of motors are configured to rotate at least one of an omni-wheel or a mecanum wheel.

5. The support robot of claim 1, wherein the robot further comprises:
   a base portion; and
   a rotatable tray connected to the base portion and rotatable about a first axis, wherein a distance between the base portion and the rotatable tray along the first axis is adjustable.

6. The support robot of claim 1, wherein the user profile is selected based on an input from the user via an input unit.

7. The support robot of claim 1, wherein the user profile is automatically selected based on an output from the detection unit.

8. The support robot of claim 1, further comprising an upper-level planning unit, wherein the upper-level planning unit updates the user profile and trend database based on an output from the detection unit.

9. The robot control system of claim 1, further comprising an upper-level planning unit, wherein the upper-level planning unit updates the user profile and trend database based on an output from the detection unit.

10. A robot control system capable of providing timely delivery of at least one selected from a group consisting of a tool, a part, a component, an electrical supply, a welding gas supply, and an air supply to a user, the robot control system comprising:
   a detection unit for detecting a motion or other signal;
   a motion planning unit producing data for controlling the motion of a robot based on an output from the detection unit;

an input unit for receiving an input from the user;

a work progress estimation unit for estimating a work progress of the user based on the input received for the detected motion or other signal by the detection unit and work progress related data stored in a work progress data repository;

a robot location adjustment unit, wherein the robot location adjustment unit adjusts a location of the robot based on an output from the motion planning unit;

a movable tray, wherein the movable tray is adjusted based on an output from the work progress estimation unit; and an upper level planning unit for updating at least one of a work process and progress database and a worker profile and trend database based off at least one of an input from the input unit and an input from the detection unit;

wherein the work progress estimation unit is in operative communication with a user profile and trend database having a plurality of user profiles stored therein, wherein the work progress estimation unit alters at least one of the motion of the robot and a motion of the movable tray based on a selected one of the plurality of user profiles.

11. The robot control system of claim 10 wherein the movable tray is rotatable about a first axis.

12. The robot control system of claim 10, wherein the robot location adjustment unit is in operative communication with at least one motor controller, wherein the at least one motor controller controls a plurality of motors, where the plurality of motors are configured to rotate at least one of an omni-wheel or a mecanum wheel.

13. The robot control system of claim 10, wherein the robot comprises:
  a base portion; and
  a rotatable tray connected to the base portion and rotatable about a first axis, wherein a distance between the base portion and the rotatable tray along the first axis is adjustable.

14. The robot control system of claim 10, wherein the user profile is selected based on an input from the user via the input unit.

15. The robot control system of claim 10, wherein the user profile is automatically selected based on an output from the detection unit.

16. The robot control system of claim 10, wherein the robot is connectable to at least one of an air supply, a welding gas supply, and an electrical supply and provides at least the one of the air supply, welding gas supply, and the electrical supply to the user.

17. A method for providing at least one of a tool, a part, a component, an electrical supply, a welding gas supply, and an air supply to a user, via a support robot having a tray rotatable about a first axis and a plurality of wheels for moving the support robot along a surface, the method comprising:
  detecting a user motion or other signal via a detection unit;
  planning a motion of at least one of the rotatable tray and the plurality of wheels via a motion planning unit based on at least an output from the detection unit;
  estimating a work progress of a user based on the input received for the detected user motion or other signal by the detection unit and work progress related data stored in a work progress data repository; and
  controlling at least one of a motor in operative communication with the rotatable tray or at least one motor in operative communication with the plurality of wheels based on said planning;
  wherein controlling the at least one of a motor comprises altering at least one of a motion of the robot and a motion of a movable tray based on a selected one of a plurality of user profiles stored in a user profile and trend database.

18. The method for providing at least one of tools, parts, components, an electrical supply, a welding gas supply, and an air supply to a user of claim 17, the method further comprising:
  communicating with a work progress estimation unit in signal communication with a work progress data repository; and
  updating at least one said planned motion of at least one of the rotatable tray and the plurality of wheels based on data stored in the work progress data repository.

* * * * *